June 18, 1957 N. S. BESTOSO 2,795,907

APPARATUS FOR WRAPPING CYLINDRICAL OBJECTS

Filed April 9, 1952 6 Sheets-Sheet 1

INVENTOR.
Napoleon S. Bestoso
BY
Gilbright Arnold
ATTORNEY

June 18, 1957 N. S. BESTOSO 2,795,907

APPARATUS FOR WRAPPING CYLINDRICAL OBJECTS

Filed April 9, 1952 6 Sheets-Sheet 2

INVENTOR.
Napoleon S. Bestoso

BY Albright Arnold

ATTORNEYS

APPARATUS FOR WRAPPING CYLINDRICAL OBJECTS

Filed April 9, 1952 6 Sheets-Sheet 3

INVENTOR.
Napoleon S. Bestoso
BY
[signature]
ATTORNEY

APPARATUS FOR WRAPPING CYLINDRICAL OBJECTS

Filed April 9, 1952 6 Sheets-Sheet 4

INVENTOR.
Napoleon S. Bestoso
BY
G. Wright Arnold
ATTORNEY

June 18, 1957 N. S. BESTOSO 2,795,907

APPARATUS FOR WRAPPING CYLINDRICAL OBJECTS

Filed April 9, 1952 6 Sheets-Sheet 5

INVENTOR.
Napoleon S. Bestoso
BY
G. Wright Arnold
ATTORNEY

June 18, 1957 N. S. BESTOSO 2,795,907

APPARATUS FOR WRAPPING CYLINDRICAL OBJECTS

Filed April 9, 1952 6 Sheets-Sheet 6

INVENTOR.
Napoleon S. Bestoso
BY
Gilbright Arnold
ATTORNEY

United States Patent Office 2,795,907
Patented June 18, 1957

2,795,907

APPARATUS FOR WRAPPING CYLINDRICAL OBJECTS

Napoleon S. Bestoso, Tacoma, Wash., assignor to Brown & Haley, Tacoma, Wash., a corporation of Washington Application April 9, 1952, Serial No. 281,345

40 Claims. (Cl. 53—57)

My invention relates to a method of wrapping cylindrical objects and apparatus therefor.

More particularly, my invention relates to providing a wrapping machine for speedily and economically placing a wrapper about stick candy. Attempts have been made to provide machines to wrap stick candy but such have not proven practically operative. The situation was such that when applicant was in need of such a machine he was compelled to make an original device as set forth herein because he could not find a machine on the market to do the job.

One of the features which must be carefully provided in a machine of this character is that it will not break the stick candy which normally is fragile. Also, the stick candy has relatively sharp end portions due to the fact that it is broken by fracturing apart from the rod candy from which it is formed. In providing a wrapping machine for such stick candy, provision had to be made to prevent breaking or puncturing of the cellophane wrapper when twisted about the fractured end of the candy stick in providing the closure of the wrapper. Another important feature is that the machine must be equal to high speed production and particularly to be reliable for continuous running for successive shifts of operators. Orders must be filled by a particular time. Furthermore, a machine embodying the present invention must be one that will use substantially the minimum of wrapping material to avoid waste. A machine may save its entire cost of manufacture in the course of a few months when wrapping 150 sticks per minute of candy of the ordinary size (4¼" long and 7/16" in diameter).

For the purpose of clearness of description, applicant will set forth his invention as applied to providing wrapping for stick candy, however, it is to be understood that the invention is not to be restricted to any such specific application but is applicable to all cases where like problems exist.

The above-mentioned general objects of my invention, together with others inherent in the same, are attained by the mechanism illustrated in the following drawings throughout which drawings like reference numerals indicate like parts:

Figure 1:
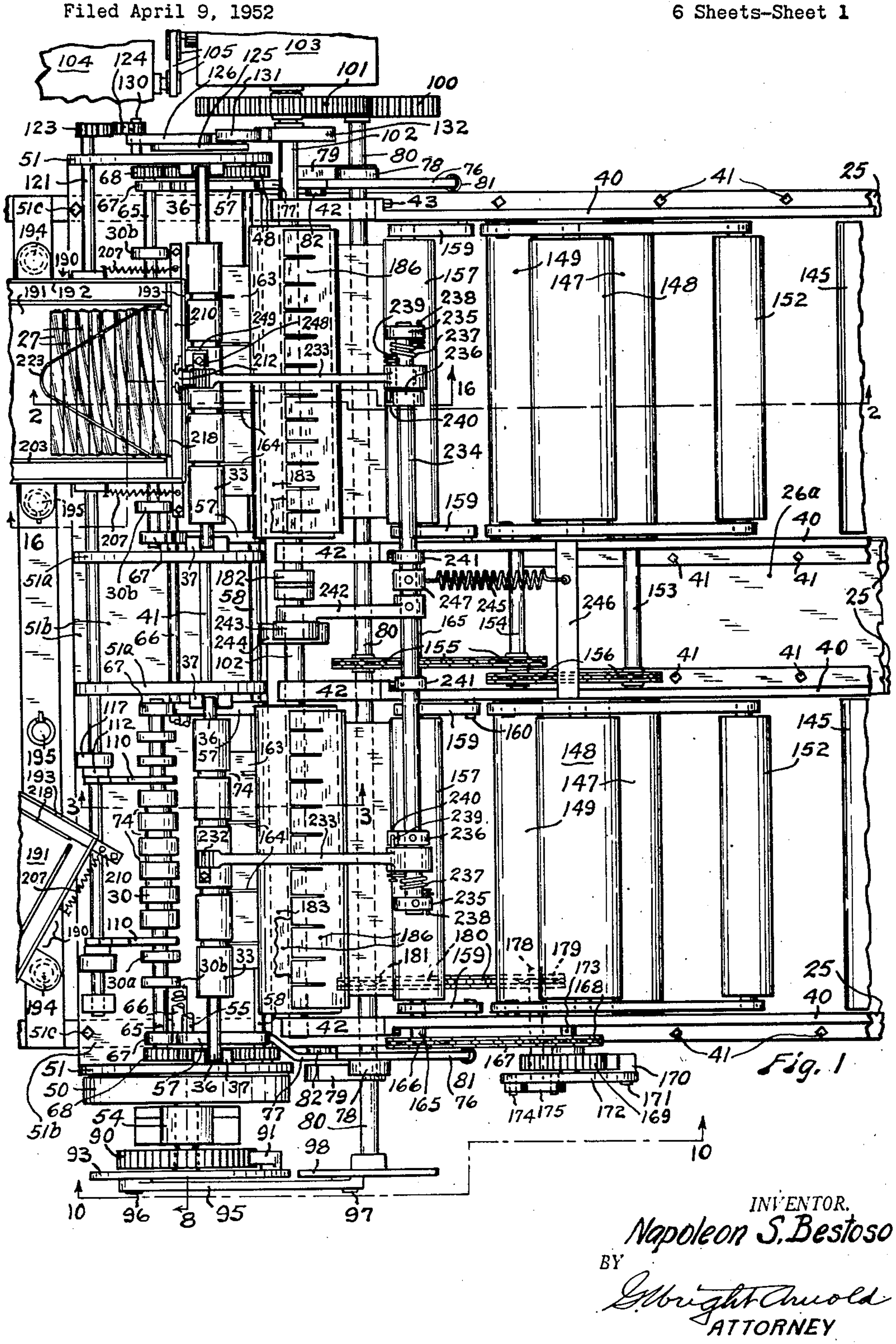
Figure 1 is a plan view, with parts broken away and parts omitted in the interest of clarity, of a multiple unit wrapping machine constructed in accordance with this invention.
Figures 2, 3, 4, 22:
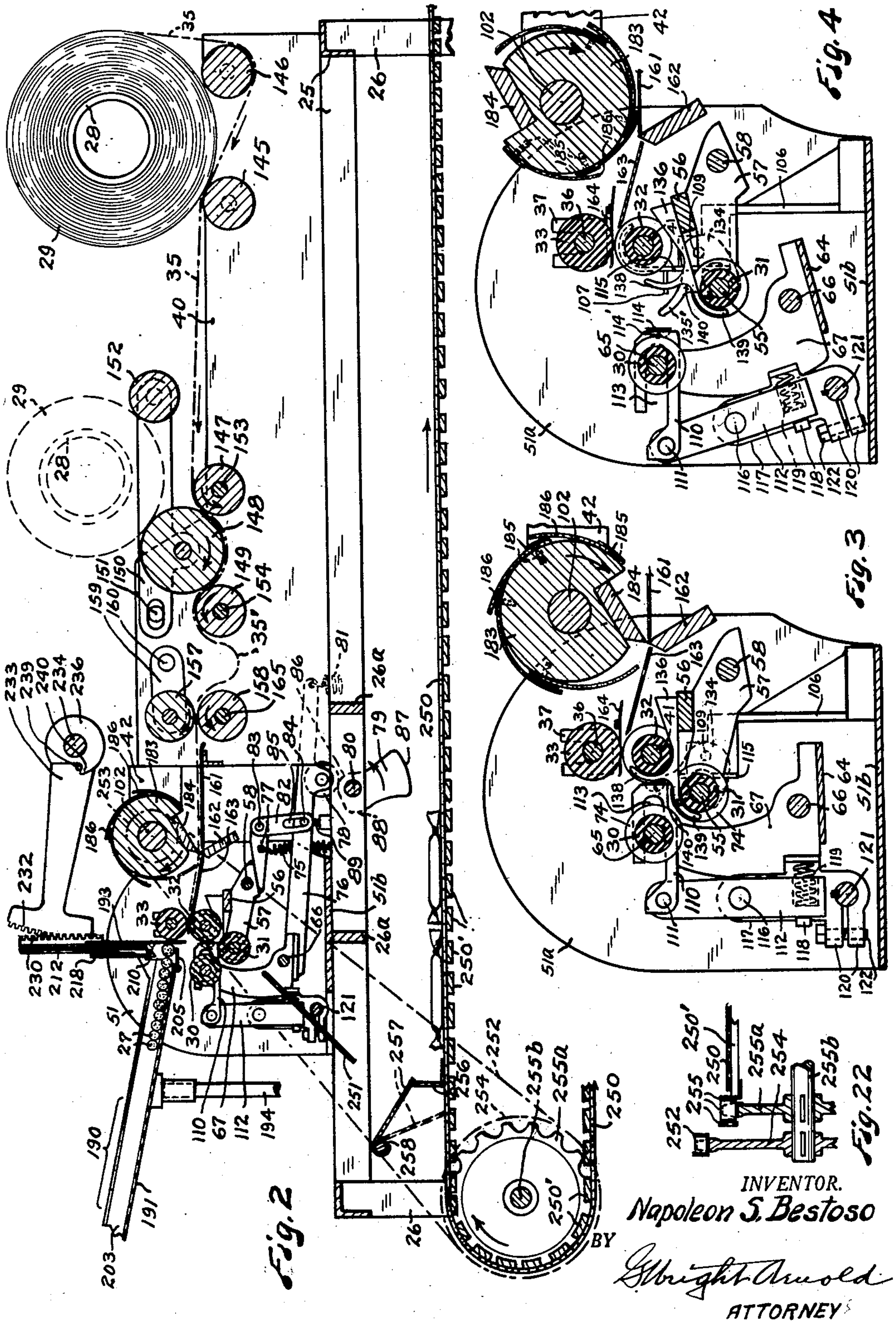
Fig. 2 is a view, partly in section and partly in elevation and with parts broken away, taken substantially on broken lin 2—2 of Fig. 1, parts being diagrammatically shown and wrapper forming material which is not shown in Fig. 1 being illustrated partly diagrammatically.
Fig. 3 is a fragmentary view, partly in section, partly in elevation, and with parts omitted, taken substantially on broken line 3—3 of Fig. 1 and on a larger scale than Fig. 1, showing wrapping rollers and twister clamps and ejector devices in a position they will occupy when a cylindrical object is being wrapped and the ends of the wrappers twisted.
Fig. 4 is a view similar to Fig. 3 showing the wrapping rollers and twister clamps and ejector devices in a position they will occupy when a cylindrical object is being ejected therefrom after wrapping.
Figure 6:
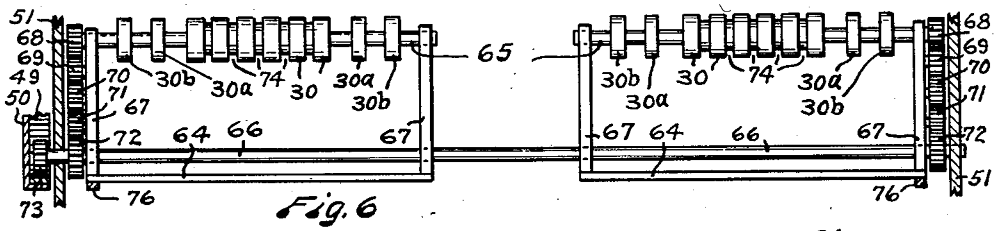
Fig. 6 is a somewhat diagrammatic detached view, partly in section and partly in plan, showing a pair of front wrapping rollers together with roller driving and roller moving means for said rollers.
Figures 10, 11, 12, 13, 14, 15:
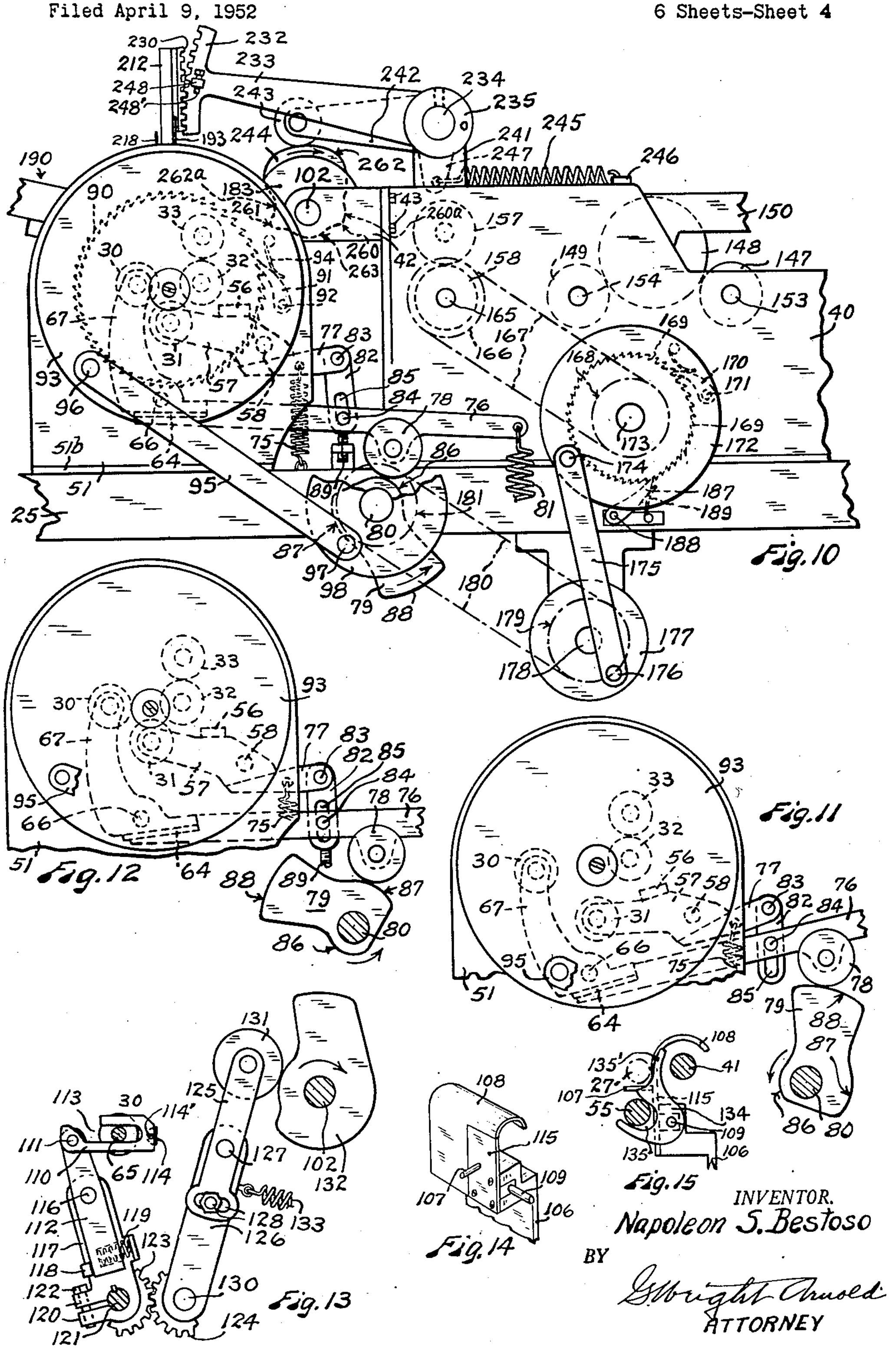
Figures 16, 17, 18, 19, 20, 21:
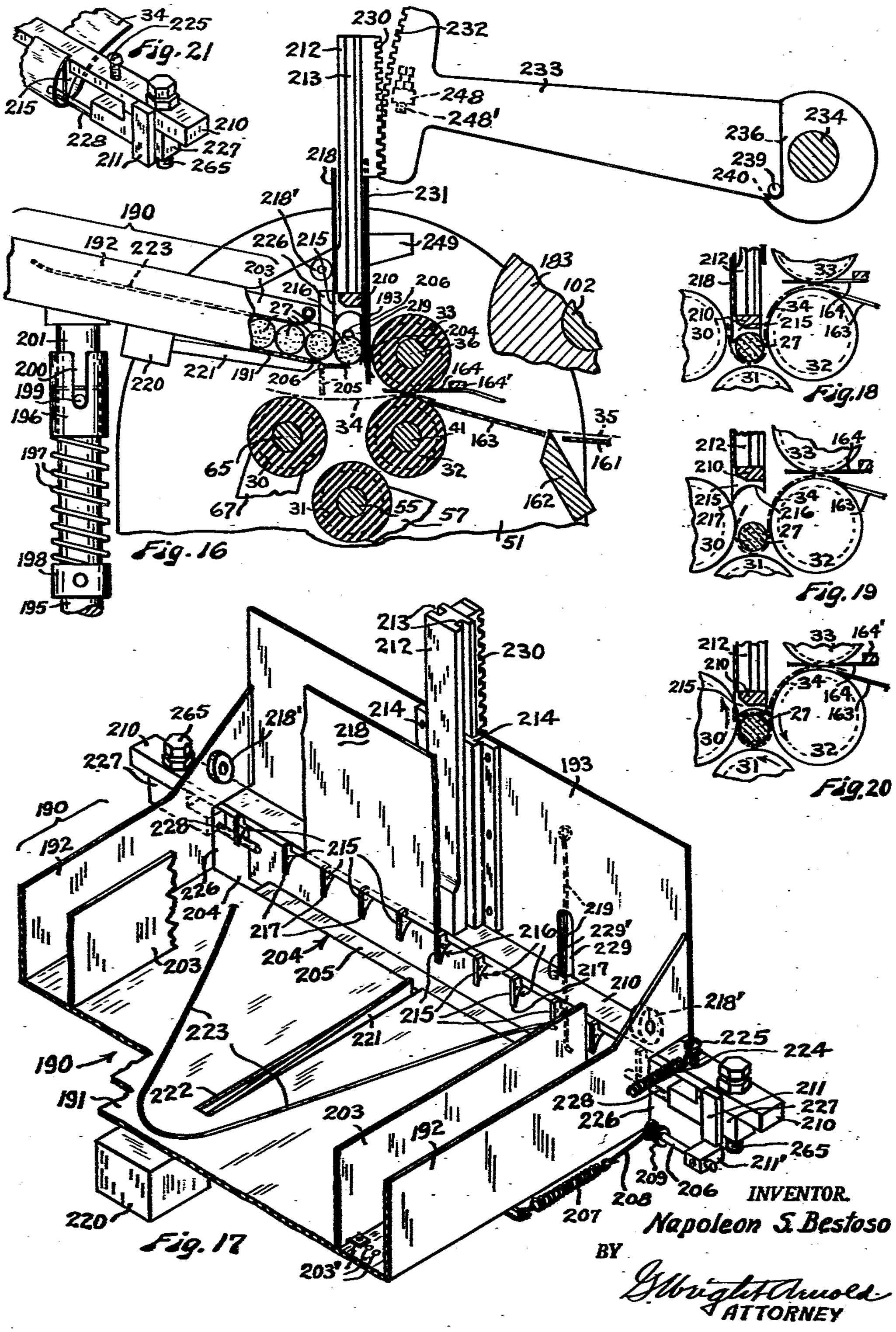
Figure 23:
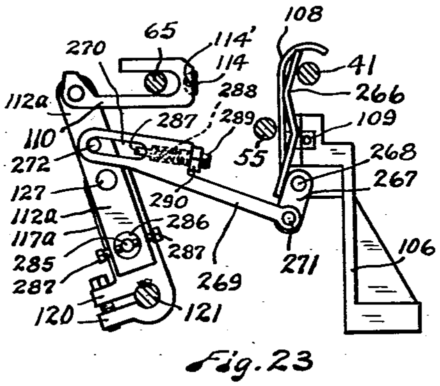
Figure 24:
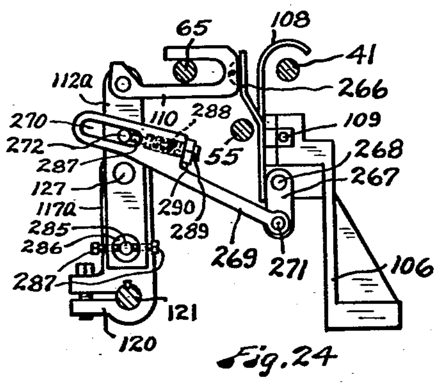
Figure 25:
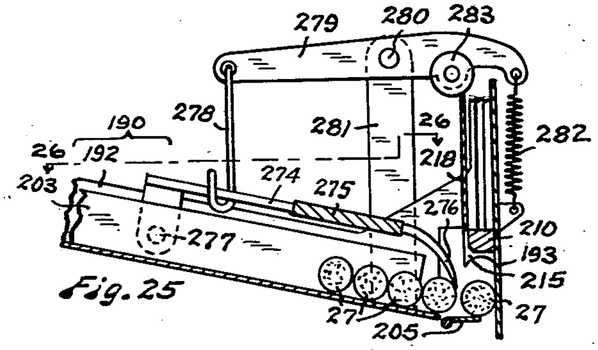
Figure 26:
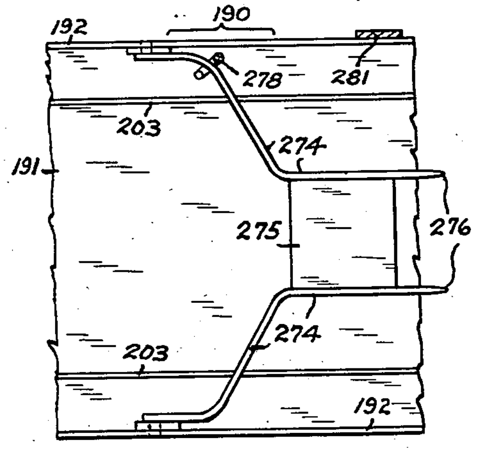

Fig. 10 is a somewhat diagrammatic detached view in elevation, with parts broken away, looking in the direction indicated by broken line 10—10 of Fig. 1, and on a larger scale than Fig. 1, showing wrapping rollers by dotted lines and showing means for transversely moving said wrapping rollers and means for intermittently driving said rollers and means for intermittently driving a wrapper material feed roller and means for vertically moving a gate which controls the feed of candy sticks into the machine;

Fig. 11 is a somewhat diagrammatic detached view, partly in section and partly in elevation similar to Fig. 10 but showing wrapping rollers and cam controlled roller moving means in an object discharging or fully retracted position;

Fig. 12 is a view similar to Figs. 10 and 11 except that the cam controlled roller moving means and rollers are shown in a partially closed or object receiving position;

Fig. 13 is a detached view in elevation, with parts in section and parts omitted, showing cam controlled means for operating twister clamps which clamp and hold overhanging end portions of a wrapper while a cylindrical object and a wrapper thereon are being rotated to secure or close the ends by twisting the extending ends of the wrapper;

Fig. 14 is a fragmentary detached perspective view showing parts which cooperate in twisting portions of a wrapper which overhang or extend beyond the ends of wrapped objects;

Fig. 15 is a fragmentary detached view partly in elevation and partly in section of the devices shown in Fig. 14 together with an ejector member which is pivotally supported thereby and some of the wrapping roller shafts;

Fig. 16 is a view partly in elevation and partly in section and with parts omitted, taken substantially on broken lines 16—16 of Fig. 1, and on a larger scale than Fig. 1, showing feeding means and tucker and tube forming means for cylindrical objects;

Fig. 17 is a detached isometric view of parts of the feeding means and parts shown in Fig. 16;

Fig. 18 is a somewhat diagrammatic detached fragmentary view, partly in section and partly in elevation showing how a feed bar pushes a cylindrical object down into a wrapper and between wrapping rollers;

Fig. 19 is a view similar to Fig. 18 showing the feed bar moved upwardly a short distance and a front roller moved inwardly;

Fig. 20 is still another view similar to Fig. 18 showing another position of the feed bar and front roller and showing how the feed bar cooperates in guiding a wrapper around a cylindrical object;

Fig. 21 is a fragmentary isometric view illustrating the way a tube forming finger which is carried by a feed bar cooperates in shaping an end portion of a pliable wrapper into tubular form;

Fig. 22 is a fragmentary view partly in section and partly in elevation illustrating mounting means for a conveyor belt by which wrapped objects are removed from the machine;

Fig. 23 is a detached view in elevation, with parts in section, showing twister clamp means of modified form and showing twister clamp members in retracted position;

Fig. 24 is a view similar to Fig. 23 showing the twister clamp members in wrapper holding position;

Fig. 25 is a view partly in section and partly in elevation showing modified means which operates like an escapement and which may be used to control the discharge of cylindrical objects from a feed chute; and Fig. 26 is a plan view with parts in section taken substantially on broken line 26—26 of Fig. 25, showing an escapement member and part of a feed chute.

The drawings show a multiple unit wrapping machine designed to receive and wrap and dispose of two lines of substantially cylindrical objects which are therein shown as candy sticks, but which may be other objects of generally cylindrical shape.

The frame of this machine comprises horizontal frame members 25 supported on legs 26 and having such transverse and longitudinal frame members 26a as are needed to efficiently support mechanism to receive and wrap and dispose of two lines of cylindrical articles 27, such as candy sticks. Upright frame plates 40 are removably secured to frame 25, as by screws 41 and bearing brackets 42 removably secured to their forward ends as by screws 43 (Figs. 1, 2 and 10).

Parts which are of duplicate construction in the two lines of production of the machine are similarly numbered.

Each line of production includes wrapping rollers operable to wind wrappers of pliable material such as cellophane around cylindrical articles and to twist the end portions of these wrappers which extend beyond the ends of the articles; means operable to support a roll of the pliable wrapper forming material and to unwind and cut off the same to form wrappers, means to feed cylindrical objects to the wrapping rollers; and means to receive and convey away the wrapped objects. Cellophane, as a wrapping material, presents special problems when applied by a machine to a cylindrical object, such as curling and ease of puncturing.

*Wrapping rollers*

Each set of three wrapping rollers (i. e. each set for each unit) comprises a front roller 30, a bottom roller 31, a back roller 32, and a floatingly mounted wrapper hold-down top roller 33. Each top roller 33 is positioned above and rests on a back roller 32 and cooperates with said back roller 32 in advancing to a correct position wrappers 34 which are cut from wrapper forming material 35. Each top roller 33 preferably has an axial shaft 36 individual for each unit—each unit in general must be capable of separate operation to accommodate slight variation in diameter of the rolls due to wear. The respective end portions of each shaft 36, see Figs. 1, 3 and 4, are rotatively supported in U-shaped bracket members 37 which are secured to fixed upright frame plates 51 and 51a, Fig. 1. The brackets 37 thus floatingly and rotatively support the top rollers 33. Preferably plates 51 and 51a and wrapping rollers 30, 31, 32 and 33 and the parts which support and operate said rollers are mounted on an assembly plate 51b which is secured to the frame 25 by readily removable means, such as cap screws 51c. Thus the wrapping roller assembly is rendered readily removable as an assembly for repair and cleaning.

Figure 7:
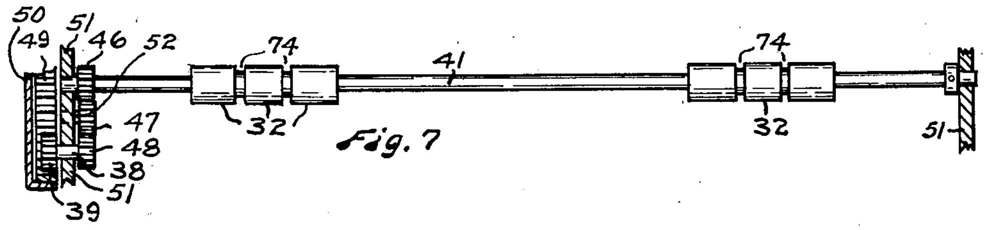
Fig. 7 is a somewhat diagrammatic detached view, partly in section and partly in plan, showing a pair of back wrapping rollers and means for driving the same.

The two back rollers 32 are preferably secured on a common axial shaft 41 which extends entirely across the machine and beyond the ends of said rollers 32 and is journaled in at least two of the fixed bearing plates such as the two plates 51, see Figs. 1 and 7. This supports the back rollers 32 so that they may be rotatively driven but are not movable toward and away from the positions occupied by the articles 27 while said articles are being wrapped. One end portion of the common shaft 41 of back rollers 32 (see Figs. 7 and 9) has a gear pinion 46 fixedly secured thereto. Pinion 46 has a driving connection through an idler pinion 47 and another pinion 48 and a short shaft 38 and another pinion 39 with an intermittently movable internal gear 49, which is disposed in and is rigid with a drum 50. Short shaft 38 is rotatively supported by a bearing plate 51 and pinion 47 is rotatively mounted on a bearing stud 52 which is rigid with the bearing plate 51. Rotary movement of ring gear 49 in a selected direction as indicated by arrow will rotate the back rollers 32 in a corresponding direction as indicated by the arrows in Fig. 9.

Figure 5:
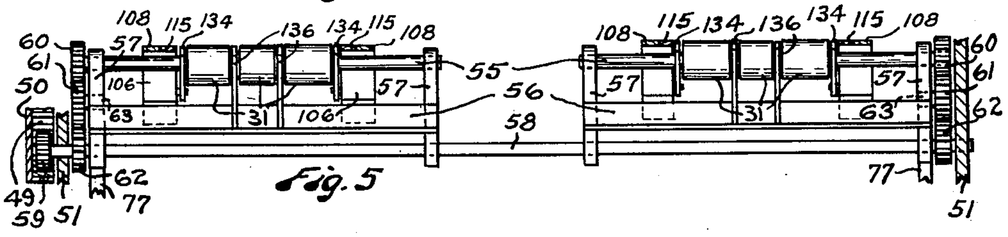
Fig. 5 is a somewhat diagrammatic detached view, partly in section and partly in plan, showing a pair of lower wrapping rollers and roller driving and roller moving means for said lower rollers.
Figure 9:
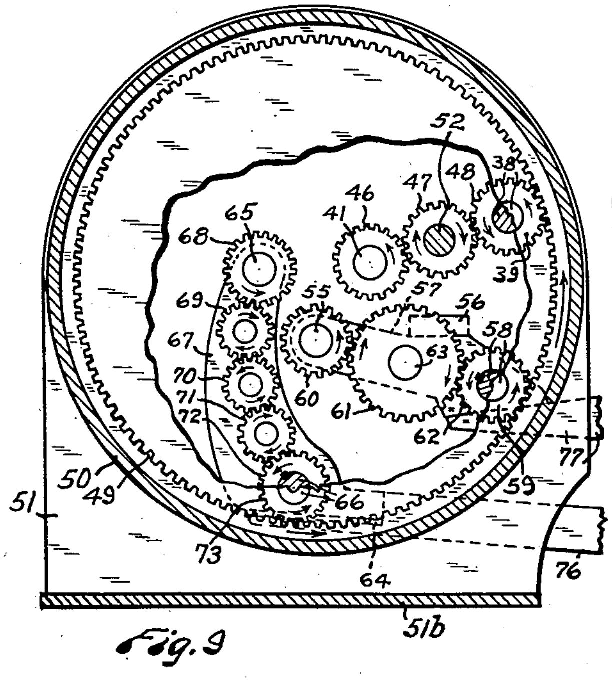
Fig. 9 is a sectional view, with parts in elevation and parts broken away, taken substantially on broken line 9—9 of Fig. 8, and on a larger scale than Fig. 8, showing roller driving and roller moving means for the wrapping rollers.
Figure 8:
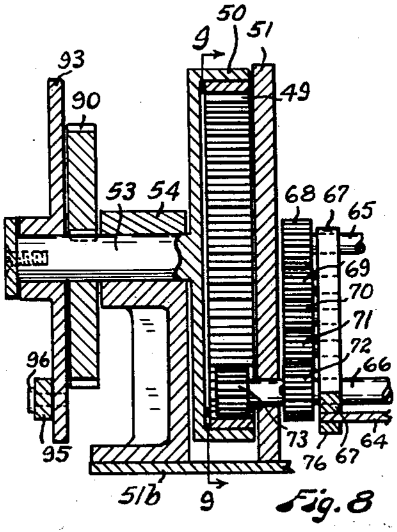
Fig. 8 is a sectional view, with parts in elevation, taken substantially on broken line 8—8 of Fig. 1, and on a larger scale than Fig. 1, showing means for supporting and driving and transversely moving some of the wrapping rollers.

The drum 50 has a rigid axial bearing shaft 53, Fig. 8, which is rotatively supported by a bearing bracket 54. Each bottom roller 31 individual for each unit, Figs. 1, 3, 4, 5 and 9, is secured to a shaft 55, which is rotatively supported in the forward end portions of two spaced apart lever arms 57. The two lever arms 57 which support each cross shaft 55 are rigidly connected with each other by a cross bar 56 and the end portions of all of the lever arms 57 remote from the rollers 31 are pivotally mounted on a common (i. e. for both units) cross shaft 58 which is rotatively supported by the bearing plates 51. One end portion of the shaft 58 extends into the drum 50, as shown in Figs. 5 and 9, and has a fixedly attached pinion 59 which meshes with the ring gear 49.

The end portion of each shaft 55 adjacent the side of the machine has a gear pinion 60 secured thereto. Each pinion 60 has a driving connection with the driven cross shaft 58 by means of an idler pinion 61 and another pinion 62 which is fixedly mounted on said driven cross shaft 58. Each idler pinion 61 is rotatively mounted on a bearing pin 63 which is rigid with the adjacent lever arm 57. This provides a driving means for rotating the bottom rollers 31 and at the same time supporting said bottom rollers so that they are transversely movable toward and away from the position occupied by a cylindrical object while the same is being wrapped—this being adjustable for different diameters of candy sticks or cylindrical objects. The means for transversely moving the bottom rollers 31 and the front rollers 30 toward and away from the work is hereinafter described.

Each front roller 30, Figs. 1, 3, 4, 6, 8 and 9, is fixedly mounted on a shaft 65 which is rotatively supported in the upper end portions of two spaced apart lever arms 67. The two lever arms 67 which support each shaft 65 have their bottom end portions rigidly connected with each other by a cross bar 64. The lower end portions of all of the lever arms 67 are pivotally or idly mounted on a common cross shaft 66 which is rotatively supported as by the frame members 51. One end portion of the shaft 66 extends into the drum 50, see Figs. 6 and 9, and has a fixedly attached pinion 73 which meshes with the ring gear 49. The end portions of each front roller shaft 65 adjacent the side of the machine has a gear pinion 68 secured thereto. Each pinion 68 has a driving connection through gear pinions 69, 70 and 71 with a gear pinion 72 which is fixedly mounted on the cross shaft 66. Obviously when rocking movement is imparted to the cross bars 64 and the arms 67, which are rigid therewith, the front rollers 30 will be moved transversely relative to the position occupied by objects which are being wrapped. At the same time driving relation between the roll carrying shafts 65 and the ring gear 49 will be maintained. The pinions 69, 70 and 71 are rotatively mounted on suitable bearing studs which are carried by the adjacent lever arms 67.

The several gear trains by which rollers 30, 31 and 32 are driven are designed so that they will rotate these rollers at the same speed and in the same direction. The rollers 30, 31 and 32 are preferably made of rubber or a composition including rubber which has a high coefficient of friction and enough elasticity to minimize danger of breaking objects which are being wrapped.

The several rollers 30, 31, 32 and 33 are provided with annular slots 74 where necessary to provide working clearance for devices which cooperate with these rollers, as hereinafter explained.

Preferably two spaced apart annular collars 30*a* and 30*b* are provided on each front roller shaft 65 outwardly from each end of each front roller 30. The collars 30*a* help to support the outermost end portions of the wrappers 34, while the wrappers are being pushed down between the rollers and wound around the cylindrical objects 27. The outermost collars 30*b* cooperate in positioning a gate bar by which the objects 27 and wrappers 34 are pushed down into a wrapping position, as hereinafter explained.

Rocking or angular movement of each cross bar 64 and the lever arms 67 secured thereto, for the purpose of moving the front rollers 30 toward and away from the work, is controlled by a lever arm 76. One of the lever arms 76 is rigidly secured to each cross bar 64 adjacent the outer end thereof and extends to the right as shown in Figs. 2, 9, 10, 11 and 12. Also a lever arm 77 is secured to the lever arm and bar means 56 and 57 by which each bottom roller 31 is carried and moved and extends in the same direction as the lever arm 76. Each lever arm 76 has a cam follower or roller 78 rotatively mounted thereon and positioned in engagement with a cam 79 on a constantly driven shaft 80. The shaft 80 extends across the machine (i. e. both units) and is connected by spur gears 100 and 101, Fig. 1, with the power output shaft 102 of a speed reduction gear 103. The speed reduction gear 103 is driven from a motor 104 as by a V belt and sheave means 105. Resilient means such as a tension spring 81 connected with each lever arm 76 yieldingly urges the lever arm 76 in one direction and holds the cam roller 78 against the cam 79. Also a resilient means such as a tension spring 75 is connected with the lever 77 and yieldingly urges the bottom roller 31 upwardly. A stop 89 limits this upward movement as will be explained. Said stop 89 is adjustable for cylindrical objects of different diameter and also to compensate for wear of the rolls 31.

A link 82, Figs. 2, 10, 11 and 12, has one end portion connected by a pivot member 83 with the outer end portion of each lever arm 77 and its other end portion connected by a pivot member 84 which the adjacent lever arm 76. At least one of the pivot members of each link 82, such as pivot member 84, operates in a longitudinal slot 85 in the link 82 whereby lost motion is provided between the two levers 76 and 77. This lost motion provides a desired sequence of movement of the bottom roller 31 and front roller 30 as hereinafter explained. The stop member 89 is positioned for engagement by the lower end portion of the link 82 to limit the movement of parts 31, 57 and 77 resulting from the pull of spring 75.

Levers 76 and 77, cams 79, rollers 78, springs 81 and link means 82, 83, 84 and 85 are in duplicate on opposite sides of the machine, see Fig. 2 for one set of these parts and Figs. 10, 11 and 12 for another set, and provide independent but interconnected means for synchronously moving the front and lower wrapping rollers of each line of production toward and away from the articles which are being wrapped. The springs 81 and 75 urge the two rollers 30 and 31 of each set toward the article being wrapped and these springs allow the rollers with which they are connected to adjust themselves to conform to the diameter of the article 27 which is being wrapped. Thus, if an article 27, such as a candy stick, in one set of rollers is slightly larger than the article 27 in the other set of rollers, each set of rollers will engage with its own article 27 with the proper pressure independently of the other set of wrapping rollers. The cams 79 are both secured to the same shaft 80 and are aligned with each other angularly considered so that both sets of wrapping rollers will be moved toward and away from the work simultaneously. Thus, the size of the article receiving recess or pocket for each unit is subject to being varied to meet the requirements of each object being wrapped by the rollers of a given unit. The springs 81 provide for this variation and thereby protect against breaking the object or stick of candy being wrapped (Figs. 2, 10, 11 and 12).

The following description of the wrapper roller moving means, as applied to Figs. 10, 11 and 12, will apply also to the wrapping roller moving means on the opposite side of the machine and which is shown in part in Figs. 1, 2, 5 and 6.

Referring to Figs. 10, 11 and 12, when the cam 79 is in a position as shown in Fig. 10 and the cam roller 78 rests on an arcuate portion or dwell 86 of said cam the springs 75 and 81 will yieldingly hold the rollers 30 and 31 in the wrapping position in which they are shown in Figs. 2, 3 and 10. The cam 79 moves in the direction indicated by the arrows in Figs. 10, 11 and 12 and the rollers 30 and 31 will remain in engagement with an object 27 long enough to wrap a wrapper 34 around the same and twist the ends of said wrapper while the cam roller 78 is rolling on the arcuate or dwell portion 86 of cam 79. Beyond the dwell 86 of the cam 79 is an abruptly raised portion 88 which, when it passes under the follower 78, will quickly angularly move the levers 76 and 77 into a position as shown in Fig. 11. Movement of lever 76 by the cam lobe 88 will first move the front roller 30 away from the object which has been wrapped but will not begin to move the lower roller 31 downwardly against the tension of the spring 75 until after the lost motion provided by movement of the pivot member 84 in the slot 85 has been taken up. This gets the front roller out of the way of the wrapped object before ejector members of a form hereinafter described start to operate.

Further movement of the cam 79 in a counter-clockwise direction, Figs. 2, 10, 11 and 12, will cause the cam roller 78 and levers 76 and 77 to be lowered into positions substantially as shown in Fig. 12 with the cam roller 78 resting on an intermediate dwell portion 87 of the cam 79. In this position each lower wrapping roller 31 has been moved upwardly by the spring 75 to an object wrapping position but each front wrapping roller 30 is held outwardly a short distance from its wrapping position preparatory to receiving the next object 27 to be wrapped. After the next object 27 is delivered to the wrapping rollers the lowermost dwell portion 86 of the cam 79 will move under the cam roller 78 and the front wrapping roller 30 will be moved against the object 27 for another wrapping operation.

The means for intermittently imparting rotary movement to the drum 50 and ring gear 49 to intermittently rotate the wrapping rollers 30, 31 and 32 of both sets is as follows: A ratchet wheel 90, see Figs. 1, 8 and 10, is secured to the bearing shaft 53 of the drum 50 and is engaged by a pawl 91. The pawl 91 is mounted by a pivot pin 92 on a disc 93 and is yieldingly held in engagement with the ratchet wheel 90 by a spring 94. A connecting rod 95 has one end portion connected by a pivot pin 96 with the disc 93 and the other end portion connected by a pivot pin 97 with a disc 98 which is secured to the constantly driven shaft 80. The distance between the pivot pin 97 and the axis of rotation of the shaft 80 is substantially less than the distance between the pivot pin 96 and the axis of rotation of the disc 93 so that rotation of the disc 98 will oscillate the disc 93. Oscillation of the disc 93 will cause the ratchet wheel 90 and pawl 91 to impart intermittent movement in a continuous direction to the drum 50. The disc 93 is supported for oscillation on the bearing shaft 53.

The means just described for intermittently rotating the wrapping rollers 30, 31 and 32 is timed so that these rollers will be rotated while in wrapping position and will not be rotated when in a retracted or object discharging position. This movement is characterized by the fact that the rotation movement is stopped uniformly at the same point in each cycle. Thus, the cellophane or other wrapper 34 is positioned uniformly by the back roller 32.

Devices are provided for holding the portions of the wrapper 34 which extend beyond the ends of an object 27, during at least a part of the time the object 27 and wrapper 34 thereon are being rotated to thereby close and twist the end portions of the wrapper beyond the ends of the object 27. These devices, see Figs. 1, 2, 3, 4, 13 and 14, are in the nature of twister clamps 110, two of which cooperate with each set of wrapping rollers. Each twister clamp 110 is connected by a pivot 111 with the upper end portion of a lever arm 112. Also each twister clamp 110 has a notch 113 which fits over the adjacent front roller shaft 65 of a front roller 30 so that the twister clamp is properly positioned and guided by the shaft 65 without interferring with movement of the shaft 65 and the front roller 30. Each twister clamp 110 further has a self-adjusting wrapper engaging member 114 pivotally connected as by a pivot member 114' with the forward end of said twister clamp and adapted to be pressed against an overhanging end part of a wrapper 34 to clamp the end portion of the wrapper firmly against a stop member 115, Figs. 3, 4, 5, 14 and 15, at the proper instant in the wrapping operation and just before the wrapping rollers cease to rotate the wrapped object.

Each lever arm 112, Figs. 2, 3, 4 and 13, is fulcrumed by a pivot member 116 on the upper end portion of a secondary lever arm 117. A stop member 118 on each secondary lever arm 117 limits pivotal movement of lever arm 112 relative to lever arm 117 in one direction. A compression spring 119 yieldingly supports the lower end portion of each lever arm 112 against movement in a direction away from the stop member 118. Each secondary lever arm 117 preferably has a split lower end portion 120 which fits over a twister clamp operating shaft 121 and is adjustably but securely clamped to said shaft 121 as by bolt means 122. The shaft 121 extends across both lines of production of the machine (i. e. both units) and carries the four twister clamps 110 for the two sets of wrapping rollers in the two lines of production. Each compression spring 119 serves as a resilient cushioning means for its lever arm 112 and is capable of yielding when the clamp 110 carried by said lever arm 112 is pressed against a wrapper which is supported by one of the stops 115. Each stop 115, see Fig. 14, is preferably removably secured to a frame bracket 106 and carries an outwardly extending pin 107 which helps to support the end portion of a wrapper 34 which extends beyond the end of the object being wrapped. Stop members 115 can be replaced in case of wear. A wrapper guide member 108 of inverted J shape is also secured to each bracket 106 and extends alongside of and above the stop member 115 and over the shaft 41 of the adjacent back roller 32 to help guide the overhanging or extended end portions of the advancing wrappers 34. A pivot pin 109 is supported by frame bracket 106 and extends transversely from the inner side of said bracket to receive and pivotally support an ejector member 134 of a form hereinafter described.

Angular movement is imparted to the shaft 121 and the lever arms carried thereby by means of gear segments 123 and 124. The gear segment 123 is rigid with the shaft 121. The gear segment 124 is rigid with the lower end portion of a lever which is formed of two parts 125 and 126. The lever parts 125 and 126 are adjustably connected with each other by a pivot member 127 and slot and bolt means 128. The lower end of lever part 126 is fulcrumed on a fixed pivot member 130 and the gear segment 124 is concentric relative to the pivot 130. A cam follower roller 131 is rotatively mounted on the upper end portion of lever part 125 and is urged into contact with a cam 132 by a spring 133, one end being secured to the frame. The cam 132 is fixedly mounted on the power output shaft 102 of the speed reduction gear 103. The power output shaft 102 and the driven shaft 80 are synchronized so that they rotate at the same rate of speed and the cam 132 is shaped and positioned so that it will apply the twister clamps 110 to the wrappers 34 at the proper instant and for the proper length of time in each cycle of operation of the machine to insure twisting of the end portions of the wrappers beyond the ends of the objects 27 after the wrappers 34 have been wrapped around the objects 27.

The fixed clamping member 115 of the twister clamp means just hereinbefore described is positioned substantially flush with the forward peripheral portion of the back roll 32 and substantially flush with the back peripheral portion of the object 27 to be wrapped, as will be apparent from Figs. 3, 4, 14 and 15. This makes it necessary for the twister clamps 110 to press the end portions of wrappers 27 back against the clamp members 115 and in so doing to draw or bend the wrapper material across the ends of the objects 27. When these objects 27 are candy sticks their ends may be rough and uneven and may have sharp ridges which may perforate or break through the wrappers.

Figs. 23 and 24 show twister clamp means of modified construction which is adapted to grip and hold the end portions of the wrappers in a plane coincident with the axis of the objects 27. In said Figs. 23 and 24 the parts 41, 55, 65, 106, 108, 109, 110, 120, 121 and 127 are the same as the similarly numbered parts previously shown and described. The twister clamp supporting lever in Figs. 23 and 24 comprises two parts **112*a* and 117*a*. Part 117*a* has a rigid pin 285 which protrudes into an oversized opening 286 in the lower end portion of part 112*a*. Two set screws 287 threaded into part 112*a* and abutting pin 285 provide for relative adjustment of parts 112*a* and 117*a* about their pivot 127. A movable clamp member 266 is secured to a lever arm 267 which is mounted on a pivot pin 268 on the adjacent bracket 106. A diagonal connecting link 269 has one end portion connected by a pin 271 with the lower end portion of the lever arm 267 and its other end portion connected by a pin 272 with the upper lever part 112*a*. The pin 272 operates in a slot 270 of link 269. A plunger 287 is movably supported by link 269 and is urged by a compression spring 288 toward pin 272. A screw 289 with lock nut 290 adjustably supports the spring 288. Clamp member 266 is resiliently supported by spring 288 when in the position shown in Fig. 24. The slot 270 and pin 272 afford needed lost motion. When the lever 212*a*, 217*a* is in the position shown in Fig. 23, the clamp member 266 will be inclined or retracted. When said lever is positioned as shown in Fig. 24, the upper end portion of the movable clamp member 266 will be moved toward the twister clamp 110** and the two clamp members will cooperate in clamping the end of a wrapper substantially in the medial vertical plane of an object which is being wrapped.

After an object 27 has been wrapped and the extended ends of the wrapper twisted and the rollers 30 and 31 have moved to the object discharging position in which they are shown in Fig. 4, the wrapped object will ordinarily discharge downwardly by gravity. However, it is possible for a wrapped object to fail to thus discharge by gravity and for this reason a plurality of ejector members 134 and 136, Figs. 3, 4, 5 and 15 are provided in connection with the rollers 31 and 32. Preferably at least two of the ejector members 134 and two of the ejector members 136 are provided in connection with each set of wrapping rollers. Each ejector member 134, see Fig. 15, is pivotally supported on one of the pivot pins 109 carried by frame brackets 106. This positions each ejector member 134 a short distance outwardly from the adjacent end of an object 27 which is being wrapped. Also each ejector member 134 has a recess or notch 135 which fits over the adjacent bottom roller shaft 55 and further has an upwardly extending arm 135' which extends upwardly close to but just outwardly from the adjacent end of the back roller 32 while an object is being wrapped. When the lower roller 31 moves downwardly into an object releasing position the ejector members 134 connected therewith will be moved into a position as illustrated in Fig. 4 and will help to push the wrapped object out of the wrapping rollers. Preferably one ejector member 134 is provided adjacent each end of the rollers 31, see Fig. 5. The other ejector members 136 are secured to a cross bar 56 which is rigid with the lever arms 57 which carry the bottom rollers 31. The end portion of each ejector member 136 forwardly of the cross bar 56 is forked to provide an upwardly curved finger 138 and a downwardly curved finger 139. The front edge portions of the two fingers 138 and 139 of each ejector member 136 form a concave recess 140 where they merge and this recess 140 provides clearance for the object 27 when the several parts are in the position in which they are shown in Fig. 3. Also the fingers 138 of the ejector members 136 prevent the object being wrapped from being fed into wrong positions and also prevent the objects from being drawn back between the rotating rollers 31 and 32.

The curved fingers 138 and 139 are adapted to lie within suitably positioned annular grooves 74 in the back rollers 32 and the bottom rollers 31. When the bottom rollers 31 are lowered into a position as shown in Fig. 4 the ejector members 136 will be moved downwardly along with said bottom rollers and will positively push out any cylindrical object 27 which remains in the position it occupied while it was being wrapped. The ejector members 134 are capable of pushing the cylindrical objects 27 a little further outwardly than are the ejector members 136 and insure the ejection of an occasional wrapped object 27 which might not be fully ejected by the ejector members 136. However, the ejector members 134 engage with the twisted end portions of the wrappers 34 just beyond the ends of the wrapped objects and if an end portion of a wrapper becomes torn the ejector member 134 at the other end of the object may tend to disalign the wrapped object and urge the end thereof with the torn wrapper back between the rollers 31 and 32. The ejector members 136 will prevent this disalignment of an object with a torn wrapper. For these reasons it has been found desirable to use the two sets of ejector members 134 and 136 in connection with each set of wrapping rollers.

*Wrapper feed and cut-off means*

Wrappers 34 for the candy sticks are cut from wrapper forming material 35, such as cellophane, which is supplied from rolls 29, one of which is shown at the right in Fig. 2. Two spaced apart non-driven rollers 145 and 146 are rotatively mounted by frame members 40 in each line of production near the end of the frame 25 remote from the wrapping mechanism. Each pair of rollers 145 and 146 is adapted to support a roll 29 of cellophane or like wrapping material. The material 35, shown by a dot and dash line in Fig. 2 preferably passes from the roll 29 down and over and around the outermost roller 146, thence forwardly and over the roller 145. This provides some friction and insures that the wrapping material will be drawn taut and placed under some tension.

From the roller 145 the wrapping material 35 passes forwardly over a constantly driven metering roller 147 and under an idler hold-down metering roller 148 and over another constantly driven metering roller 149. The idler hold-down roller 148 may be a wooden roller. It is rotatively mounted between two side bars 150 which are connected by slot and pivot means 151 with the side frame members 40. A cylindrical member 152, which serves both as a weight and a handle and which may also serve as a roller, is rotatively mounted between the end portions of each pair of side bars 150 remote from the pivots 151. The hold-down roller 148 is loosely supported by the bars 150 so that it is self-adjusting to the rollers 147 and 149 and will provide an even pressure of the wrapper forming material 35 against both of the rollers 147 and 149. This insures a positive and exact measured feed of the wrapper forming material. The metering rollers 147 and 149 in the two lines of production are respectively mounted on cross shafts 153 and 154. Sprocket chain and sprocket wheel means 155, Fig. 1, connects the cross shaft 154 with the previously described driven shaft 80 and other sprocket chain and sprocket wheel means 156 connects the two shafts 153 and 154 with each other. This provides constant speed drive means for driving the metering rollers 147 and 149 with floating metering roller 148 at the same speed and in the right direction.

From each roller 149 the wrapping material 35 passes forwardly and between two intermittently operating slack take-up feed rollers 157 and 158 which are positioned one above another. Each lower roller 158 is intermittently driven. Each uppermost roller 157 is floatingly supported by links 159 which are pivotally connected with the frame members 40 by pivot pins 160. Each uppermost roller 157 rests floatingly on the wrapper forming material 35 thus providing ample frictional contact between this material and the lower slack take-up roller 158 to advance this material 35 intermittently. From the slack take-up rollers 157 and 158 the wrapper forming material 35 passes successively over a fixedly supported guide plate 161 and over a lower rigidly supported knife blade 162 and over another fixed guide plate 163 and between the two intermittently driven wrapping rollers 32 and 33. The rollers 32 and 33 tension the wrapper forming material and insure that it will be cut into uniform lengths.

Preferably a plurality of transversely spaced apart guide or wrapper hold-down fingers 164, Figs. 3, 4 and 16, extend between the two wrapping rollers 32 and 33 to prevent the wrappers 34 from adhering to the upper roller 33 and being carried upwardly and around said upper roller 33 in the event said roller 33 becomes sticky. Preferably the hold-down fingers 164 operate in annular grooves 74 in the upper rollers 33 and extend a substantial distance forwardly of the line of contact of the two rollers 32 and 33. The rear ends of the hold-down fingers 164 are spaced above the guide plate 163 and are attached to fixed support means 164'.

The driving means for the intermittently operating slack take-up rollers 157 and 158 is connected with a cross shaft 165 which carries the lowermost roller 158 in both lines of production. This driving means, somewhat diagrammatically shown in Figs. 1 and 10, comprises a sprocket wheel 166 on the shaft 165, connected by a sprocket chain 167 with another sprocket wheel 168. The sprocket wheel 168 is rigidly attached to a ratchet wheel 169 which is engaged by a spring pressed pawl 170. The pawl 170 is attached by a pivot 171 to a disc 172. The sprocket wheel 168 and ratchet wheel 169 and disc 172 are all mounted on a bearing axle 173 carried by the frame 40. The disc 172 is connected by a crank pin 174 with the upper end portion of a connecting rod 175. The lower end portion of the connecting rod 175 is connected by a crank pin 176 with another disc 177. A bearing axle 178 supports the disc 177. A sprocket wheel 179 is rigidly attached to the disc 177, and is connected by a sprocket chain 180 with another sprocket wheel 181 on the constantly driven shaft 80.

The distance of the crank pin 176 from the axis of the bearing axle 178 is substantially less than is the distance of the crank pin 174 from the axis of the bearing axle 173. Obviously rotation of the disc 177 will impart oscillation to the disc 172 and this will intermittently rotate the feed roller 158 and intermittently advance the wrapper forming material 35. The metering rollers 147, 148 and 149 provide a constant feed of wrapper forming material 35 and provide a slack portion of this material which hangs in a loop 35′, Fig. 2, between the roller 149 and the roller 158. These metering rollers 147, 148 and 149 thus insure the feeding of an accurately metered amount of material at each cycle of operation. This metering of the material conserves material and insures that the wrappers which are cut off by the knives 184 and 162 will all be of uniform size. In feeding the material forwardly the slack take-up rollers 157 and 158, after feeding forward the slack in loop 35′, provide slippage on and tension of the material. A holding pawl 187, Fig. 10, mounted on a fixed part of the frame by a pivot 188 and held against the ratchet wheel 169 by a spring 189 prevents reverse angular movement of said ratchet wheel.

The power output shaft 102, see Figs. 1, 2, 3 and 4, from the speed reduction gear 103 extends across both lines of production of the machine and may have one or more flexible couplings 182 provided therein. Two knife carrying rolls 183 are rigidly mounted on the power output shaft in the respective lines of production. Each knife carrying roll 183 carries a knife 184 which cooperates with the adjacent fixed knife 162 to cut off wrappers 34 from the wrapper forming material 35. Each knife carrying roll 183 also carries one or more flat pliable brush members 186 which have their leading edges secured to the roll as by screw and plate means 185 and each brush 186 extends throughout substantially the length of its roll 183. These brush members 186 may be formed of rubber or rubber composition having a high coefficient of friction. Four of the brush members 186 are shown on each roll 183 in the accompanying drawings. The free edge portions of these brush members 186 engage with the wrapper forming material 35 as the knife rolls 183 rotate and help in feeding forward the leading edge portions of said wrapper forming material. The knife carrying rolls 183 are synchronized with the other parts of the machine so that they cooperate in cutting off wrappers 34 at the proper time in the cycle of operation of the machine.

*Feed means for cylindrical objects*

Each line of production of the machine is provided with feeding means which is adapted to feed cylindrical objects 27 one at a time, to the wrapping rolls. Each set of feed means, see Figs. 1, 2, 10 and 16 to 21 inclusive, comprises an inclined tray or feed chute 190 having a flat bottom 191 and upright sides 192 and an upright end plate 193 on the discharge end thereof. Each feed chute 190 is supported at the front of the machine and is positioned with its discharge end substantially over the location where the cylindrical objects 27 are engaged and wrapped by the wrapping rollers 30, 31 and 32. Preferably two upright supports 194 and 195, Figs. 1, 2 and 16, which are rigid with the frame of the machine, are provided at opposite sides of each chute 190 and near the discharge end thereof. Also preferably each chute 190 is pivotally connected with one support, such as support 194, Figs. 1 and 2, and is connected with its other support 195, Figs. 1 and 16, by readily detachable means. One detachable means which may be used for this purpose comprises a slidable collar 196 movable on the support 195 and urged upwardly by a compression spring 197 which rests on a fixed collar 198 on said support 195. A fixed radial pin 199 in the upper end portion of the support 195 operates in a notch 200 which extends from the upper end of the slidable collar 196 downwardly therein. When the notch 200 is aligned with the pin 199 the slidable collar 196 can project above the upper end of the support 195 and fit telescopically over a downwardly protruding shank 201 which is rigid with a feed chute 190. When the slidable collar 196 is pressed downwardly on the support 195 it will release the shank 201 and said slidable collar 196 may be turned so that the pin 199 will engage with the top edge portion of the slidable collar 196 and hold said collar down.

The readily detachable collar 196 secures the chute 190 with which it is connected in proper alignment for delivering objects 27 when it is in engagement with a shank 201. When the readily detachable collar 196 of a chute 190 is detached from the shank 201 then the chute 190 may be angularly moved on its other support 194, see Fig. 1, into an out-of-the-way position as respects the adjacent wrapping rollers 30, 31, 32 and 33. The chute 190 fragmentarily shown in the upper part of Fig. 1 is aligned with its line of production. The chute 190 fragmentarily shown in the lower part of Fig. 1 is in a disaligned and out-of-way position.

Each chute 190 is adapted to contain a plurality of cylindrical objects 27 positioned in side-by-side contacting relation so that they will roll by gravity toward the discharge end of the chute. Preferably two upright spaced apart guide members 203 are provided in each chute to prevent end-wise disalignment of the objects 27 as they roll down the chute. These members 203 preferably are secured to the bottom of the chute 190 by adjustable means 203, Fig. 17, so they can be transversely adjusted to accommodate objects 27 of different length.

The bottom wall 191 of each feed chute terminates short of the end wall 193 of the chute to provide a discharging opening 204, Figs. 16 and 17, which is at least partially closed by a spring supported swinging gate 205. The cylindrical object 27 adjacent the end wall 193 is supported on the gate 205 but the gate 205 and opening 204 are not wide enough to allow more than one object 27 at a time to roll down onto said gate 205. The edge of the gate 205 remote from the wall 193 is secured to a transverse rod 206 which is hinged to the chute 190 and said gate 205 is yieldingly urged upwardly by spring means. This spring means may be a tension spring 207 having one end attached to the feed chute 190 and the other end attached to a flexible connector or cord 208. The cord 208 extends around a small drum or spool 209 which is secured on the rod 206 to which the gate 205 is attached. The gate 205 can swing downwardly into a position as indicated by broken lines in Fig. 16 to permit the feeding of a cylindrical object 27 to the wrapping rollers. In its downwardly extending position the gate 205 will not extend low enough to interfere with the feeding forward of a wrapper 34. The end plate 193 of each feed chute 190 extends below the level of the gate 205 when the gate is in raised position. Obviously a torsion spring may be used on the gate 205 in place of parts 207, 208 and 209.

Vertically reciprocable feed means is provided in each feed chute 190 above the leading object 27 and adjacent the front end plate 193 for insuring the feeding of successive objects 27 downwardly to the wrapping rollers. Each feed means comprises a vertically movable horizontal feed bar 210. Each horizontal feed bar 210 has an upright post 212 rigidly secured thereto perpendicular to the bar and preferably about midway between the two ends thereof. Each post 212 has two U-shaped grooves 213, Fig. 17, in the respective sides thereof which slidably fit over and receive two spaced apart track members 214. The track members 214 are secured to the adjacent front end plate 193 and they guide and support the bar 210 and parts connected therewith in their vertical movement. A plurality of tucker fingers 215 are rigidly secured to each feed bar 210 in spaced apart relation lengthwise of the bar. Each tucker finger 215 extends across the bottom of the bar 210 and upwardly across the front edge of the bar 210 which is remote from the wall 193. The lower edge 216 of each tucker finger is curved to conform to the curvature of the cylindrical objects 27. The front edge of each tucker finger 215 extends within the annular grooves 74 of roll 30 so as to get behind the wrapper. The tips 217 of the tucker fingers which are furthest removed from the wall 193 are relatively sharp and cooperate in engaging with the wrappers 34 and guiding said wrappers around objects 27 which are being wrapped. The tucker fingers 215, see Figs. 17 to 20 inclusive, are spaced apart and are relatively narrow thereby reducing friction.

A hold-back plate 218 is fixedly secured to each post 212 above the bar 210 and above the tucker fingers 215 and substantially flush with the tucker fingers. Preferably rollers 218', Figs. 16 and 17, are mounted on the sides 192 of each feed chute 190 for engagement by the end portions of the adjacent hold-back plate 218. The rollers 218' help to support the vertically movable parts of the feed means. When the bar 210 is moved from a raised to a lowered position it will push or follow the leading cylindrical object 27 downwardly past the gate 205 and the tucker fingers 215 and hold-back plate 218 will engage with the second object 27 and hold-back all of the objects 27 in the tray until the bar 210 is again moved upwardly. To avoid subjecting the objects 27 to gate opening pressure and reduce the danger of breakage of said objects 27 a gate opening finger 211, Figs. 17 and 21, is preferably attached to each bar 210 adjacent one end thereof and is adapted to contact a lever 211' on the pivot rod 206 of the adjacent gate and open the gate. When the gate 205 is opened by pressure of the finger 211 on lever 211' the object 27 which is resting on the gate 205 will usually drop by gravity onto a wrapper 34.

An electric safety switch 220 is provided in connection with each feed chute 190 to stop the machine when all or substantially all of the cylindrical objects 27 in either feed chute have been fed out. Each safety switch 220 is fastened to the bottom 191 of its chute 190 at any desired distance from the discharge end of the chute and is actuated by a switch lever 221 which operates in a slot 222 in the bottom 191 of the chute. Each switch lever 221 normally tends to extend a short distance above the surface of the chute bottom 191 on which the cylindrical objects 27 roll. The presence of objects 27 on a switch lever 221 will depress said switch lever and position the safety switch 220 connected therewith so that the machine will be operated. In the absence of objects 27 on a switch lever 221 said lever will return to a position which will cause the safety switch connected therewith to stop the machine.

Preferably a V-shaped resilient hold-down wire 223 is provided adjacent the discharge end of each feed chute 190 in spaced relation above the bottom 191 of the chute and in a position to exert a light downward pressure on the cylindrical objects 27 passing thereunder. The hold-down wires 223 prevent piling up of the objects 27 and insure reliable and efficient operation of the safety switches 220.

Preferably the track members 214 and grooves 213 in which they operate allow for some lost motion of the bar 210 toward and away from the front plate 193. Also preferably a tension spring 224 is provided at each side of each chute 190 and has one end attached to the chute and the other end attached to a screw 225 which extends upwardly from an adjacent end portion of the bar 210. It is to be noted that the end portions of each bar 210 protrude outwardly through notches 226 in the side plates 292 of the feed chute 290 when the feed bars 210 are in raised position. The lost motion afforded by the track members 214 provides for some transverse self-adjustment of the feed bar 210 and reduces the amount of breakage of slightly crooked or curved objects 27.

When the cylindrical objects being wrapped in this machine are candy sticks it sometimes happens that an occasional stick is considerably smaller in diameter than the other sticks. When a stick of substantially smaller diameter than the other sticks rests on the gate 205 adjacent the plate or wall 193 there is danger that it may allow the second stick 27 to advance far enough under the feed bar 210 so that the tips 217 of the tucker fingers 215 will break the second stick when they come down. To reduce this danger preferably two springs hold-back wires 219 are secured to the exterior of the wall 193 and extend through slots 229 in said wall 193 and lie in grooves 229' in the feed bar 210 so that they are engaged by the first stick and hold it back a short distance from the wall 193.

Figs. 25 and 26 show modified means, similar escapement mechanism, which may be used for controlling the movement of the cylindrical objects 27 along an inclined feed chute 190 so that all of said objects except the first one in the line are held back while the reciprocable feed bar 210 is operating. This escapement means is designed to minimize the breaking of breakable cylindrical objects 27, such as candy sticks, which are not always of uniform size and shape. When this escapement means is used the hold-back wires 219 may be dispensed with.

This escapement means comprises an escapement member which may consist of two side arms 274 rigidly secured together by a plate 275 and which have on their forward ends two downwardly inclined curved pawls 276 adapted to engage with the second object 27 from the discharge end of the chute 190. Obviously more than two of the pawls 276 may be provided. The end portions of the arms 274 which are remote from the pawls 276 diverge, as shown in Fig. 26, and are connected by aligned pivot members 277 with the side plates 192 of the chute 190. This allows the pawl carrying ends of the arms 274 to be raised and lowered. One arm 274 of each escapement device is connected, near its pivot 277, by a hook shaped link 278 with one end portion of a lever arm 279. The lever arm 279 is fulcrumed by a pivot 280 on a bracket 281 which is fixed to the chute 190. The end portion of the lever arm 279, shown at the right in Fig. 25, extends over and across the fixed front plate 193 of the feed chute 190 and is connected with a tension spring 282 by which it is urged downwardly. A roller 283 is mounted on the lever 279 above the vertically movable hold-back plate 218 which is carried by the feed bar 210.

When the feed bar 210 and hold-back plate 218 are in their uppermost position, as shown in Fig. 25, the upward pressure of the plate 218 on roller 283 will overcome the tension of the spring 282 and angularly move the lever 279 so as to lower the link 278 and permit gravity to move the escapement members 274, 275, 276 downwardly. This causes the pawls 276 to engage with the second object 27 in the chute 19 and hold-back all except the first object 27. After the feed bar 210 begins to move downwardly in its next cycle of operation and after the tucker fingers 215 have moved in front of the second object 27 the spring 282 will lift the escapement member enough so that the pawls 276 release the second object 27 and allow said second object 27 to move against the tucker fingers 215 and hold-back plate 218. When the plate 218 again moves upwardly the then first object 27 in line will roll onto the gate 205 and after the plate 218 engages the roller 283 the pawls 276 will again move downwardly into engagement with the then second object in line. The escapement means thus always prevent forceful contact of the tucker fingers 215 with the second object in line and this minimizes the danger of breaking cylindrical objects, such as candy sticks, which are breakable and which vary somewhat in diameter and which may be somewhat crooked. The hook-shaped links 278 afford desired lost motion and permit the escapement member to be angularly moved upwardly, anti-clockwise as respects the showing in Fig. 25, into an out-of-the-way position.

Each end portion of each feed bar 210, Figs. 17 and 21, has a bracket 227 attached to its bottom side and extending downwardly therefrom. Each bracket 227 carries a rigidly attached inwardly extending tube forming finger 228. Each tube forming finger 228 is spaced downwardly from the adjacent concave bottom edges 216 of the tucker fingers 215 and is approximately parallel to the gate bar 210. The tube forming fingers 228 are always positioned outwardly beyond the ends of the cylindrical objects 27 and said fingers are adapted to come down in the overhanging end portions of the wrapper 34 in the manner illustrated in Fig. 21, and push the wrappers down into their proper position and shape the wrappers 34 in to tubular form. The end portions of the wrappers 34 may rest on the pins 107, Figs. 14 and 15, at this time. After pushing the wrappers 34 down and helping to form the same into tubular shape the tube forming fingers 228, along with the feed bar 210, are moved upwardly a short distance and help to hold the end portions of the wrappers in a proper position to be engaged and clamped by the twister clamps 110. The tube forming fingers 228 only extend a short distance into the ends of the wrappers and the twisting of the end portions of the wrappers shortens the wrappers enough so that the tube forming fingers 228 will easily clear the wrappers when the bar 210 moves upwardly after an object has been wrapped. One of the difficulties encountered in handling light flexible wrappers 34 at high speed is that the wrappers are liable to be deflected by air resistance away from the true positions they should occupy. The tube forming fingers 228 help to prevent air deflection of the wrappers from their correct positions. At least one bracket 227 of each feed bar 210 preferably has one of the gate opening members 211, Fig. 17, connected therewith and this member 211 engages the lever 211′ and opens the gate 205 as the feed bar 210 moves down. This obviates putting pressure on a cylindrical object 27 in opening the gate. Each end of each feed bar 210 preferably has a stop screw 265 extending downwardly therethrough. The two screws 265 of each feed bar 210 are adjusted so that the lower ends of said stop screws will engage with the shaft 55 of the bottom roll 31 and prevent the feed bar 210 from pressing a breakable object 27 against said bottom roll 31 hard enough to break the object.

The moving mechanism for each feed bar 210 preferably comprises a gear rack bar 230 secured to the face of each upright post 212 and operating in a clearance notch 231 in the adjacent front plate 193. A toothed gear segment 232 on one end of a lever arm 233 meshes with each rack bar 230. The other end of each lever arm 233 is mounted on a rock shaft 234 preferably between two collars 235 and 236, Figs. 1, 2 and 16, both of which are adjustably but non-rotatively secured to the rock shaft 234. A torsion spring 237 on the rock shaft 234 adjacent each lever arm 233 has one end secured by a pin 238 to the collar 235, and the other end secured by a pin 239 to the lever arm 233. Each pin 239 extends through and beyond the hub part of its lever arm 233 and functions as a stop member which is adapted to engage with a stop shoulder part 240 of the adjacent collar 236. Each torsion spring 237 yieldingly holds the stop pin 239 in engagement with the stop shoulder 240 but will yield and permit the shaft 234 to move rotatively without moving the adjacent gate operating arm 233 in the event the feed bar 210 which is operated by said arm 233 jams or is subjected to more than a predetermined amount of resistance to its downward movement. Each torsion spring 237 thus provides an individual resilient cushioning means for its lever arm 233 which can operate without interfering with the operation of the other lever arm 233.

The rock shaft 234 is supported for oscillation in bearings 241, Figs. 1 and 10, and has a lever arm 242 rigidly secured thereto. A cam follower roller 243 is rotatively mounted on the lever arm 242 and engages with a cam 244 which is secured to the power output shaft 102 of the speed reduction gear 103. A tension spring 245, having one end secured to a lever arm 247 on the rock shaft 244 and the other end secured to a fixed part 246 of the frame, exerts a resilient force tending to hold the cam roller 243 in engagement with the cam 244. A main lobe 262 of the cam 244 is adapted to hold the feed bar 210 and parts connected therewith in a raised position as shown in Fig. 16, for part of each cycle of operation of the machine. The cam 244, considered anti-clockwise, Fig. 10, also has a depressed portion or dwell **262*a*, a lesser lobe 261, a dwell 263 and another lesser lobe 260. As the cam 244 moves clockwise, Fig. 10, the roller 243 is lowered onto the dwell 262*a*. This lowers the feed bar 210 to a position as shown in Fig. 18. The lobe 261 next engages the roller 243 and momentarily raises the feed bar 210 from a position as shown in Fig. 18 to a position as shown in Fig. 19. The feed bar 210 is next lowered to a position as shown in Fig. 20 as the dwell portion 263 moves under the roller 243. At about the end of the wrapping operation and before the twister clamps 110 grip the end portions of the wrapper the lobe portion 260 of the cam imparts an upward movement to the feed bar 210 to get said feed bar out of the way of the twister clamp. A dwell 260*a* on the cam 244 then engages the roller 243 and momentarily holds the feed bar 210 substantially immovable while the twister clamps 110 are moving in and gripping the end portions of the wrappers, after which the cam 244 continues to move the feed bar 210 upwardly preparatory to the next cycle of operation. All of this is to the end that the tube forming fingers 228, Figs. 17 and 21, shall form the extended end portions of the wrappers 34 into a tubular form coaxial with the object 27. These tube forming fingers only extend a short distance into the end portions of the wrappers 34, sufficient only to form the end portions of the wrappers cylindrical. The twister clamps 110 engage the end portions of the wrappers 34 between the ends of the object 27 and the ends of the tube forming fingers 228. By clamping the cylindrical end portions of the wrappers 34 such end portions are collapsed and thereby are shortened so that they are disengaged from the end portions of the tube forming fingers 228**.

Preferably each gear segment 232, Figs. 1 and 16, is provided with a rigidly attached transversely extending bracket 248 which carries an adjustable stop screw 248′. Each stop screw 248′ is adapted to engage with a rigidly attached stop member 249 on the end plate 193 of the adjacent feed chute. The stop screws 248′ form adjustable means for limiting the downward movement of the feed bars 210.

Preferably an endless traveling flexible conveyor belt 250, Figs. 2 and 22, common to both lines of production of the machine is provided beneath the machine to receive the wrapped objects 27 as they are discharged from the wrapping rollers over an inclined delivery plate 251 and to convey these wrapped objects to a suitable location where they may be boxed or packaged and taken care of. Preferably the conveyor belt 250 is carried on cross slats 250′ which are secured to two suitably spaced apart sprocket chains 255, one of which is shown in Fig. 22. The sprocket chains 255 are carried on sprocket wheels **255*a* which are secured to shafts 255*b*, one of which is shown in Figs. 2 and 22. The conveyor belt 250 is supported midway between the inner and outer edges of the sprocket chains 255 in such a position that the curved end portions of the belt coincide with the pitch circles of the sprocket wheels 255*a* by which the belt is carried. This keeps the tension and velocity of the belt 250 constant at the ends where the belt curves and the sprocket chains 255 pass around the sprocket wheels 255*a*. The conveyor belt 250 is driven in the direction indicated by the arrows, Fig. 2, by means such as a sprocket chain 252 which passes around one sprocket wheel 253 on the power output shaft 102 of the speed reduction gear 103** and around another sprocket wheel 254 on the shaft 255*b*. Thus there is no possibility of slippage of the conveyor belt 250 and movement of the conveyor belt 250 is synchronized with the other moving parts of the machine. Sprocket chain 252 and sprocket wheels 253 and 254 are diagrammatically shown in Fig. 2. Preferably the conveyor belt 250 is wide enough to take care of the wrapped objects 27 from both lines of production of the machine.

At least one upstanding transverse divider plate 256 is attached to the conveyor belt 250 and serves as a partition member and marker to divide the wrapped objects 27 into batches, each containing a known or counted number of objects 27. These batches are preferably kept separate when they are removed from the belt 250 and each batch will contain a predetermined number of the wrapped objects.

To insure that a predetermined number of objects 27 will always be deposited on the belt 250 between two successive excursions of a divider plate 256 past the point of delivery of the wrapped objects, a deflector plate 257 is swingingly suspended from pivot means 258 and extends cross-wise of the machine above the top lap of the belt 250 a short distance forwardly of the location where the objects 27 drop off of the inclined delivery plate 251. When a moving divider plate 256 engages the deflector 257 it will swing said deflector 257 upwardly from a position as shown by boken lines to a position as shown by full lines, Fig. 2, and the deflector 257 will deflect all objects 27 to the front of the moving divider plate 256 until the proper instant in the cycle when the divider plate 256 will release the deflector 257 and the deflector 257 will return to the broken line position, after which the objects 27 will drop to the rear of the moving divider plate. The divider plate 256 thus cooperates with the swinging deflector 257 to insure that the delivery of the objects 27 will be shifted from in front of the divider plate 256 to the rear of said divider plate 256 at the correct instant to insure the delivery of a predetermined number of objects 27 in each batch. Obviously more than one divider plate 256 may be provided on the conveyor belt 250 depending on the length and speed of travel of said belt.

*Operation*

Much of the operation of the machine embodying my invention is set forth above in connection with the description of its construction.

In the operation of this wrapping machine a roll 29 of wrapping material 35, Fig. 2, such as transparent cellulose material, is placed on each pair of rolls 145 and 146 and the leading end portion of this wrapping material 35 is passed around the rolls 145 and 146 and over the constantly driven rolls 147 and 149 and under the floating hold-down roll 148 and between the two rolls 157 and 158. The roll 157 is a floatingly supported hold-down roll and the roll 158 is an intermittently driven metering roll. From the rolls 157 and 158 the wrapping material 35 passes forwardly over the plate 161 and between the cut-off knives 162 and 184 and over the plate 163 and between the wrapping rollers 32 and 33. The roller 33 is a floatingly mounted hold-down roller and the roller 32 is an intermittently driven roller.

The rollers 32 and 33 hold the wrapping material 35 lightly enough to provide slippage between these rollers and the wrapping material 35, with a resultant tensioning of the wrapping material 35 until the material 35 is cut off by the knives 162 and 184 at the proper instant in the cycle of operation of the machine. The intermittently driven roller 32 is rotating and is exerting enough tension to remove slack from the wrapping material at the time the material 35 is cut off and will immediately advance the cut-off wrapper 34 to a position substantially as illustrated in Fig. 16 with the forward edge portion of the wrapper resting on the front roller 30 and the rear edge portion of the wrapper held between the rollers 32 and 33. These rollers 32 and 33 cease to rotate at a time in the cycle just before they release the cut-off wrapper 34. This leaves the wrapper 34 extending across the space where an object 27 is to be dropped and wrapped with its rear edge portion held between the then non-rotating rollers 32 and 33.

Objects 27 are supplied to the trays 190 and feed by gravity toward the wrapping rollers. The foremost object 27 in each tray rests on the gate 205 when the bar 210 and parts connected therewith are in a raised position.

In the cycle of operation a wrapper 34 is moved into the object receiving position shown in Fig. 16 while the feed bar 210 is being moved upwardly to the raised position shown in Fig. 16 and while the front roller 30 and bottom roller 31 are moving, first to an article discharging position substantially as shown in Fig. 4, and then back to an article receiving position substantially as shown in Figs. 16 and 18. In this article receiving position the cam follower 78, Fig. 12, is on the arcuate portion 87 of cam 79; the bottom roller 31 has moved up to its wrapping position but the front roller 30 is momentarily stopped by the cam part 87 in a position outwardly from its wrapping position to leave sufficient room for the entrance of an object 27 between the wrapping rollers.

With a wrapper 34 and the rollers 30 and 31 in the position shown in Fig. 16, the feed bar 210 is moved downwardly by the spring 245 and under the control of the cam 244 thus opening the gate 205 and dropping or pushing the foremost object 27 down onto the wrapper 34 and between the rollers 30 and 32. The finger 211, Fig. 17, contacts the lever 211′ and opens the gate 205 as the feed bar 210 moves down. The descending feed bar 210 moves down inside of the wrapper 34 and pushes the wrapper 34 and article 27 down onto the bottom roller 31 and into a position substantially as shown in Fig. 18. The feed bar 210 is then momentarily moved upwardly a short distance by the minor cam lobe 260 and while the feed bar 210 is thus raised the front roller 30 moves inwardly to a wrapping position as shown in Fig. 19. The upward movement of the bar 210 has momentarily raised the tips 217 of the tucker fingers 215 above the leading edge of the wrapper 34 and the inward movement of the front roller 30 pushes the leading edge portion of the wrapper 34 into a position as shown in Fig. 19. The bar 210 immediately moves down again into a position as shown in Fig. 20. In this downward movement of the bar 210 the tips 217 of the tucker fingers come down within the annular grooves 74 of the front roller 30 and outside of the wrapper, and the wrapper 34 is curved and tucked around the object 27 in a manner as shown in Fig. 20. The grooves 74 of front roller 30 thus insure that the tucker fingers will come down the second time outside of the wrapper. At about this time the wrapping rollers 30, 31 and 32 start to rotate in the direction indicated by the arrows in Fig. 20 and wrap the wrapper 34 about the object 27 while the cam roller 243 is operating on the dwell 263 of the cam 244.

The tube forming fingers 228 help to support the overhanging or extended end portions of the wrapper 34 while it is being wrapped on the object. Also at about the time the wrapping of the wrapper on the object is completed and while the rollers 30, 31 and 32 are still rotating and after the feed bar has begun to move upwardly, the twister clamps 110 are moved by the cam 132, Fig. 13, into holding engagement with the tubular overhanging end portions of the wrapper 34 and further rotation of the wrapped object 27 twists both end portions of the wrapper close to the ends of the object 27.

While twisting of the ends of the wrapper is going on the cam 244 continues to move the feed bar 210 and parts connected therewith upwardly and the tube forming fingers 228 free themselves from the tubular ends of the wrapper which have been shortened by the twisting. The feed bar 210 and parts connected therewith are moved upwardly by the major lobe 262 of cam 244 toward a position as shown in Fig. 16. This allows the gate 205 to close and the object 27 next in line to roll down onto said gate.

After the end twisting of the wrapper 34 is completed and while the feed bar 210 is moving upwardly the front roller 30 begins to move forwardly or outwardly and the bottom roller 31 begins to move downwardly. These parts all move toward the positions in which they are shown in Fig. 4, and as they so move the wrapped object 27 is allowed to discharge by gravity or is pushed out by the ejector members 136 and 134. The discharging objects slide or roll down the inclined plate 251 and may be disposed of as previously described. While the wrapping and twisting were taking place the leading edge portion of the wrapping material 35 has been fed forwardly and has passed between the two rotating rollers 32 and 33. The intermittently operating feed rollers 158 and 159 serve as slack take-up rollers to feed forwardly the predetermined amount of wrapping material which has been advanced by the metering rollers 147, 148 and 149. When these rollers 158 and 159 stop rotating the leading edge of the material is between the then rotating rollers 32 and 33, as shown in Fig. 2, and said rollers 32 and 33 draw the material taut and then slip on the material until it is cut by the knives 184 and 162. Before the cut off occurs and while the end twisting of the wrapper is taking place the feed bar 210 has started to move upwardly. When the knife 184 cuts off the next wrapper the still rotating rollers 32 and 33 feed this next wrapper forwardly and cease to rotate while the trailing edge portion of this next wrapper is still held between said rollers 32 and 33, Fig. 16. The wrapper is thus held while discharge of the previously wrapped object is being completed and the rollers 30 and 31 are being moved back to the positions in which they are shown in Figs. 16 and 19 with the front roller 30 under the leading edge portion of the new wrapper 34 and all parts ready to start the next wrapping operation.

The wrapper material feeding mechanism is characterized by the following features:

The rolls 32 and 33 have a faster peripheral speed at the time the wrapper material 35 is in the cut-off position shown in Fig. 2. The rolls 32 and 33 are revolving faster at this point due to the variable speed mechanical motion provided by the crank means 95, 96, 97 and 98, Fig. 10. Slack take-up rolls 157 and 158 are revolving more slowly at this particular point of the cycle by reason of the variable speed mechanical motion provided by crank means 172, 174, 175, 176 and 177, Fig. 10. This results in tension being imposed upon the wrapping material 35 during the cut-off by knife 184. This tension is developed by rollers 32 and 33, flexible brushes 186 (preferably corrugated, the better to grip the wrapping material), and slack take-up rolls 157 and 158. Said brushes 186 not only help advance the wrapper material 35 but they also function to hold down the leading portion of said wrapper forming material 35 so it will positively pass under the wrapper hold-down fingers 164, Figs. 3, 4 and 16. Thus any tendency to curve up due to its previous roll form is overcome, and this is particularly important when the roll is reduced to a small diameter for the last portion of the roll.

In the next portion of the cycle the rolls 157 and 158 are stopped and thus the loop 35' develops and there is no interference with the accurate metering of the wrapper material 35 by the rolls 147, 148 and 149. It will be understood that during substantially 180° motion of crank pin 176, rolls 157 and 158 are in motion and for substantially 180° said rolls are stopped. Said cranks 176, 177, 97, 98 and associated parts are employed to prevent and control the inertia of the roll mechanism thus preventing overrunning of the material being fed. This contributes to positive precise accuracy of metering and positioning which characterize the device of my invention. It will also be understood that metering rolls 147, 148 and 149 are constantly driven.

The floating metering roller 148 and combined weight, handle and roller 152, Figs. 1 and 2, function as an optional second set of roll of wrapping material supporting rollers. The roll of wrapping material 29 may be placed on these optional rollers 148 and 152, as indicated by dash lines in Fig. 2. When thus placed on these rollers 148 and 152 the roll of wrapping material 29 places additional weight on the floating metering roller 148 so that the wrapping material 35 is gripped more tightly between the metering rollers 147, 148 and 149 and a more positive feed of wrapping material is provided. Thus if any slippage occurs between the wrapping material and the metering rollers 147, 148 and 149 this slippage may by stopped by placing the roll 29 of wrapping material on the rollers 148 and 152. When the roll of wrapping material 29 is supported on rollers 148 and 152 the wrapping material 35 may be passed back around either or both of the rollers 145 or 146 and thence forwardly or it may be passed directly to and between metering rollers 147 and 148. Obviously more pull will have to be exerted by the metering rollers 147, 148 and 149 to unwind wrapping material from a large heavy roll of the same than will be required to unwind the wrapping material from a smaller and lighter roll. When the roll 29 of wrapping material is carried on the rollers 148 and 152 then the force with which the metering rollers 147, 148 and 149 grip the wrapping material 35 will vary in direct proportion to the weight of the roll of wrapping material.

In some instances it may be desirable to use two superposed layers of wrapping material. When this is to be done then one roll of wrapping material may be supported on the rollers 145 and 146 and another roll on the rollers 148 and 152 and the wrapping material from both rolls may be fed between the metering rollers 147, 148 and 149.

The wrapping roll assembly, being mounted on the plate **51*b*, may be quickly and easily removed, as an assembly for steam cleaning by removing the screws 51*c* which secure the plate 51*b*** to the machine frame. This steam cleaning is desirable in a machine used for wrapping candy sticks as the wrapping roll assembly is liable to have particles of candy or sticky material deposited thereon.

I claim:

1. A cylindrical object wrapping machine comprising a back wrapping roller; a front wrapping roller parallel to said back roller; roller supporting means for said front roller transversely movably supporting said front roller relative to said back roller, whereby it may be moved toward and away from said back roller; a bottom wrapping roller parallel to said other rollers; roller supporting means transversely movable supporting said bottom roller up and down in a substantially vertical plane in moving said roller into releasing position of the objects when the wrapping is completed; intermittently separating roller driving means connected with said rollers; automatic individual wrapper feeding means of which one of said rollers is a part in automatically delivering individual wrappers onto and positioned to extend across the top or said back and front rollers; and cylindrical object feeding means having an object delivery end positioned vertically above said bottom roller in gravitationally dropping objects to be wrapped upon said wrappers while extending across said back and front rollers.

2. A cylindrical object wrapping machine comprising a back wrapping roller; a front wrapping roller parallel to said back roller; roller supporting means for said front roller transversely movably supporting said roller relative the other rollers; movement imparting devices connected with said front roller supporting means; a bottom wrapping roller positioned below and parallel to said other rollers; means transversely moveably supporting said bottom roller in moving said roller substantially, directly vertically and downwardly to clear for ejection of the object to be wrapped and upwardly to receive wrapping material and object to be wrapped; intermittently operating roller driving means connected with all of said rollers simultaneously rotating and stopping all of said rollers; automatic wrapper feeding means positioned adjacent said rollers, whereby wrappers are positioned across said back and front rollers; object feeding means positioned adjacent to said rollers, whereby objects are delivered onto wrappers supported by said back and front rollers; and wrapped object ejecting means connected with said bottom roller and movable into wrapped object ejecting position by downward movement of said bottom roller.

3. A cylindrical object wrapping machine comprising a back wrapping roller; a front wrapping roller parallel to said back roller; swingingly movable roller supporting means transversely movably supporting said front roller; movement imparting devices connected with said front roller supporting means, whereby said front roller may be moved toward and away from said back roller; a bottom wrapping roller positioned below and parallel to said other rollers; roller supporting means transversely movably supporting said bottom roller; movement imparting devices connected with said bottom roller supporting means, whereby up and down movement may be imparted to said bottom roller; intermittently operating roller driving means connected with said rollers simultaneously rotating and stopping said rollers; a floatingly mounted upper roller resting on said back roller; wrapping material feeding means having wrapper material guide means terminating adjacent the contacting portions of said upper roller and said back roller, whereby wrapping material will be guided between said back roller and said upper roller; wrapping material cut-off means positioned in advance of said back roller and said upper roller, whereby the wrapping material will be cut off to form wrappers and whereby the wrappers will be advanced by said back and floating rollers and positioned across said back roller and said front roller; and object feeding means positioned adjacent said back and front rollers whereby objects are delivered onto said wrappers positioned across said back and front rollers.

4. A cylindrical object wrapping machine comprising a back wrapping roller; a front wrapping roller parallel to said back rollers; roller supporting means for said front roller transversely movably supporting said front roller relative said back roller, whereby said front roller is movable toward and away from said back roller; a bottom wrapping roller positioned below and parallel to said other rollers; movable means supporting said bottom roller, whereby said bottom roller may be moved up and down; intermittently operating roller driving means connected with all of said rollers simultaneously rotating and stopping all of said rollers; a floatingly mounted upper roller resting on said back roller; an intermittently driven wrapping material slack take-up roller positioned in spaced relation from said top roller and said back roller; a floatingly mounted hold-down roller positioned above said slack take-up roller and resting on said slack take-up roller, said slack take-up roller and said hold-down roller controlling the feed of wrapping material to said top roller and said back roller and said top roller and said back roller exerting a pull on the wrapping material and providing a slippage of the wrapping material therebetween; wrapping material cut-off means positioned between said slack take-up roller and said top and back roller, whereby wrappers cut from the wrapping material will be advanced and rest on said front roller; and object feeding means positioned adjacent said rollers, whereby cylindrical objects will be delivered onto wrappers resting on the front roller and held between the top roller and the back roller.

5. A cylindrical object wrapping machine comprising a back wrapping roller; a front wrapping roller parallel to said back roller; roller supporting means for said front roller transversely movably supporting said front roller relative said back roller; a bottom wrapping roller positioned below and parallel to said other rollers; roller supporting means for said bottom roller transversely movably supporting said bottom roller; intermittently operating roller driving means connected with said roller; wrapper feeding means positioned adjacent to said roller, whereby wrappers are delivered to said rollers; object feeding means positioned adjacent the rollers in feeding objects which are shorter than the wrappers in providing end portions of the wrappers extending beyond the ends of the object; vertically reciprocable object engaging feeding bar means disposed above the bottom roller, said reciprocating of said bar extending towards said bottom roller in pushing the object to be wrapped and its wrapper between the front and back roller; and an inwardly projecting tube forming finger carried by each end portion of said bar in spaced relation below the bar in position to engage with the end portions of the wrappers outwardly from the ends of the objects to be wrapped and cooperating in forming the wrappers into tubular shape.

6. A cylindrical object wrapping machine comprising three parallel spaced apart horizontal wrapping rollers having therebetween an upwardly opening cylindrical object receiving recess; roller driving means connected with said rollers; roller supporting means for said rollers transversely movably supporting some of said rollers relative to the other rollers, whereby the size of the recess between said rollers is varied and discharge of wrapped objects from between said rollers is provided by transverse movement of the movably supported rollers; automatic wrapper feeding means positioned adjacent to said rollers, whereby wrappers are supplied to said rollers; an inclined feed chute for cylindrical objects having a discharge opening positioned in registration with said object receiving recess; a downwardly swinging gate automatically controlling the discharge of cylindrical objects through said discharge opening; and a reciprocable feed bar movable through said discharge opening in a vertical plane and past said gate causing said gate to open.

7. A cylindrical object wrapping machine comprising three parallel spaced apart horizontal wrapping rollers positioned to provide therebetween a recess into which cylindrical objects may be dropped; roller driving means connected with said rollers; roller supporting means for said rollers transversely movably supporting some of said rollers relative the other rollers, whereby the size of the recess between said rollers is varied and the discharge of wrapped objects from between said rollers is provided; wrapper feeding means having an outfeed portion positioned adjacent to said rollers supplying wrappers to said rollers; an inclined feed chute for cylindrical objects having a discharge opening positioned above said wrapping rollers; a downwardly swinging gate automatically controlling the discharge of cylindrical objects through said discharge opening; a reciprocable feed bar movable through said discharge opening in a vertical plane and past said gate causing said gate to open; and gate opening means movable synchronously with the feed bar, whereby downward movement of the feed bar will provide opening of the gate and downward movement of a cylindrical object on the gate in advance of the feed bar and with the object clear of the feed bar.

8. A cylindrical object wrapping machine comprising three parallel spaced apart horizontal wrapping rollers positioned to provide therebetween a recess into which cylindrical objects may be dropped; roller driving means connected with said rollers; roller supporting means supporting some of said rollers for movement toward and away from the other rollers, whereby the size of the recess between said rollers is varied and the discharge of wrapped objects from between said rollers is provided; wrapper feeding means cooperating with said rollers to support a wrapper in an extended position across the recess between said rollers; an inclined feed chute for cylindrical objects having a discharge opening positioned above said wrapping rollers; a downwardly swinging gate automatically controlling the discharge of cylindrical objects through said discharge opening; a reciprocable feed bar movable through said discharge opening in a vertical plane and past said gate causing said gate to open and downwardly into the recess between said rollers, in pressing cylindrical object onto the wrapper and between said rolls; and curved tucker fingers on the object engaging parts of said feed bar which curved tucker fingers engage with a wrapper and guide the same around a cylindrical object while said object is being rotated by the rotating rollers.

9. A cylindrical object wrapping machine comprising three parallel spaced apart horizontal wrapping rollers positioned to provide therebetween an upwardly opening recess into which cylindrical objects may be dropped; roller driving means connected with said rollers; roller supporting means supporting some of said rollers for movement toward and away from the other rollers, whereby the size of the recess between said rollers is varied and the discharge of wrapped objects from between said rollers is provided; wrapper feeding means cooperating with the rollers to feed wrappers into an extended position across the recess, the wrappers being longer than the objects; inclined cylindrical object feed chute means having a discharge opening positioned above said wrapping rollers; a downwardly swinging gate automatically controlling the discharge of cylindrical objects through said discharge opening; a reciprocable feed bar movable through said discharge opening in a vertical plane and past said gate causing said gate to open and downwardly into the recess between said rollers, in causing the object to be wrapped to be deposited upon the wrapper and pressed downwardly between said rollers; and tube forming fingers carried by the end portions of the feed bar engaging the outer end portions of a wrapper beyond the ends of an object to be wrapped and forming the end portions of the wrapper into tubular shape and helping to maintain in position the end portions of said wrapper.

10. A cylindrical object wrapping machine comprising a plurality of parallel spaced apart wrapping rollers; wrapper supply means supplying wrappers to said rollers; means supplying cylindrical objects to said rollers, the wrappers being longer than the cylindrical objects and extending beyond both ends of the objects; intermittent driving means connected with said rollers, whereby said rollers may be simultaneously rotated to wind a wrapper around a cylindrical object floatingly disposed within said rollers; wrapper holding means formed of a fixed rearwardly disposed stop disposed slightly beyond each end of the object to be wrapped and a flat faced clamp movable in registration with said stop and in a plane at right angles to the axis of the cylindrical object being wrapped against the end portion of the wrapper in pressing the same fast against said stop; actuating means for said rollers causing said rollers to continue revolving in twisting the wrapper beyond its elastic limit in closing the twisted end portion of the wrapper against untwisting, and providing the end portion of a flattened form.

11. A cylindrical object wrapping machine comprising roller means supporting a roll of wrapping material; metering mechanism for said material comprising a pair of spaced apart constantly driven rollers with an idling roller floatingly supported therebetween with its periphery extending below the horizontal plane passing tangentially through the tops of the peripheries of said pair of rollers and pressing the wrapper material fed thereover against said pair of rollers over an extended area thereof in providing a constant feeding speed for said material; constantly driven wrapper cut-off means adapted to cut the wrapping material into pieces of predetermined size; and intermittently driven slack take-up roller means interposed between the wrapper cut-off means and the constantly driven metering rollers intermittently feeding metered amounts of the wrapping material to the wrapper cut-off means.

12. A cylindrical object wrapping machine comprising roller means supporting a roll of wrapping material; metering mechanism for said material comprising a pair of spaced apart constantly driven rollers with an idling roller floatingly supported therebetween with its periphery extending below the horizontal plane passing tangentially through the tops of the peripheries of said pair of rollers and pressing the wrapper material fed thereover against said pair of rollers over an extended area thereof in providing a constant feeding speed for said material; constantly driven wrapper cut-off means adapted to cut the wrapping material into pieces of predetermined size; intermittently driven slack take-up roller means interposed between the wrapper cut-off means and the constantly driven metering rollers intermittently feeding metered amounts of the wrapping material to the wrapper cut-off means; and a pair of intermittently driven wrapping rollers positioned beyond said wrapper cut-off means in the line of feed of the wrapping material, whereby said wrapping rollers receive therebetween the wrapping material and hold the same taut while the wrapping material is being cut by the cut-off means.

13. A cylindrical object wrapping machine comprising a driven cylindrical wrapper cut-off member positioned in a line of feed of wrapper material; a knife carried by said cut-off member; and flat brushes of pliable material of high friction coefficient, each of said flat pliable brushes having a leading edge portion secured to the periphery of said cut-off member and a trailing edge portion unconnected with respect to said cut-off member.

14. A machine of the character described comprising a roll of wrapping material mounting means; wrapping material feeding rolls one of which is also a back wrapping roll; a wrapper material cut-off knife, whereby separate wrappers are provided; a cylindrical object feeding means operatively disposed with respect to said feeding rolls; a reciprocatively mounted bar movable across the path of said objects having tucker fingers; a cam face controlling movement of said bar downwardly and on the inside of the wrapping material next to the object, and then upwardly; a second cam face controlling movement of said bar downwardly on the outside of the wrapping material about said object; a bottom roller reciprocatively movable upwardly and downwardly; a reciprocatively mounted twister clamp pressingly holding the ends of the wrapper while the object is being rotated and a twist is being imparted to the end portions of the wrapper; and periodically actuating means for said movable parts.

15. A machine of the character described comprising a roll of wrapping material mounting means; wrapping material feeding rolls one of which is also a back wrapping roll; a wrapper material cut-off knife, whereby separate wrappers are provided; a cylindrical object feeding means operatively disposed with respect to said feeding rolls; a reciprocatively mounted bar movable across the path of said objects having tucker fingers; a cam face controlling movement of said bar downwardly and on the inside of the wrapping material next to the object, and then upwardly; a second cam face controlling movement of said bar downwardly on the outside of the wrapping material about said object; a front roll movable towards and from said back roll which on its movement towards said back roll bends an edge portion of said wrapper towards said back roll; a bottom roller reciprocatively movable upwardly and downwardly; a reciprocatively mounted twister clamp pressingly holding the ends of the wrapper while the object is being rotated and a twist is being imparted to the end portions of the wrapper; and periodically actuating means for said movable parts.

16. A machine of the character described comprising a roll of wrapping material mounting means; a material-feeding means for said wrapping material; a feeding tray for cylindrical objects, a reciprocatively mounted feed bar movable across the path of said objects, said bar having spaced apart friction minimizing tucker fingers intermediate its length and a tube forming finger mounted on the end portion of said bar; reciprocating means whereby said bar is actuated; and a bottom roller disposed in line of movement of said bar.

17. A cylindrical object wrapping machine comprising a back wrapping roller; a front wrapping roller parallel to said back roller; a roller supporting mounting transversely movably supporting said front roller; a bottom wrapping roller positioned below and parallel to said other rollers forming a cylindrical object-receiving pocket with said other rollers and holding a cylindrical object between said rollers; roller supporting means transversely movably supporting said bottom roller; spring means connected with the roller supporting means of said front and bottom rollers, whereby said front and bottom rollers are resiliently applied to a cylindrical object held by said rollers; a cam opposing the resilient force exerted by said spring means and controlling transverse movement of said front and bottom rollers; and lost motion devices interposed between said cam and the supporting means of said bottom roller, whereby said bottom roller is held immovable while a predetermined amount of transverse movement is imparted by said cam to said front roller.

18. A cylindrical object wrapping machine comprising object feeding means, whereby cylindrical objects are fed one at a time in a predetermined line of feed; wrapper feeding means, whereby pliable wrappers are fed one at a time across the line of feed of the objects; a plurality of parallel driven wrapping rollers supported for transverse movement relative each other and spaced apart to provide an object receiving recess therebetween and positioned adjacent the location where the lines of feed of the objects and wrappers intersect, whereby wrappers will be fed across the wrapper receiving recess provided by the rollers and cylindrical objects will be delivered onto the wrappers; annular grooves in some of said rollers; and wrapped object ejecting devices disposable in said grooves in noninterfering position with the wrapper while the roller having the grooves is rotating the object being wrapped in winding the wrapper about said object.

19. A cylindrical object wrapping machine comprising object feeding means, whereby cylindrical objects are fed one at a time in a predetermined line of feed; wrapper feeding means, whereby pliable wrappers are fed one at a time across the line of feed of the objects; a plurality of parallel driven wrapping rollers supported for transverse movement relative each other and spaced apart to provide an object receiving recess therebetween and positioned adjacent the location where the lines of feed of the objects and wrappers intersect, whereby wrappers will be fed across the wrapper receiving recess provided by the rollers and cylindrical objects will be delivered onto the wrappers; annular grooves in at least one of said rollers; a reciprocable feed bar movable into and out of the object receiving recess between said rollers positively and precisely positioning the object to be wrapped between said rollers; and tucker fingers carried by said feed bar and forming part of a concave face for said feed bar in contacting the object to be wrapped and its wrapper, said tucker fingers being operable in the annular grooves in the grooved roller periodically in timed sequence.

20. A cylindrical object wrapping machine comprising a plurality of wrapping rollers whereby objects are wrapped; a discharging endless traveling belt receiving said wrapped objects; synchronized traveling means for said wrapping rollers and said belt; a divider plate carried by said belt dividing the wrapped objects into batches measured by the degree of travel of said belt; and a deflector plate pivotally suspended above said belt in the path of the delivery of wrapped objects to the belt and engageable by said divider plate in moving said deflector plate into deflecting position in discharging to the preceding batch on the belt until the divider plate moves clear of the deflector plate in providing a counted number of objects wrapped.

21. A cylindrical object wrapping machine comprising a frame; cylindrical object wrapping rollers operatively mounted on said frame; cylindrical object feeding means positioned adjacent said wrapping rollers; roll of wrapping material supporting rollers supported on said frame in spaced relation from said wrapping rollers, whereby wrapping material is supplied to said wrapping rollers; wrapper material cut-off means positioned adjacent said wrapping rollers in the line of feed of the wrapping material; two spaced apart driven wrapper material metering-feeding rollers positioned between said roll of wrapping material supporting rollers and said cut-off means; a floating roller supported on said metering-feeding rollers with the wrapping material passing therebetween; two substantially horizontal lever arms positioned adjacent the respective ends of said floating roller; bearing members on said floating roller rotatively mounted in said lever arms; slot and pin means connecting one end portion of each lever arm with said frame; and a cylindrical weight and handle member rotatively mounted in the end portions of said lever arms remote from said slot and pin means whereby is provided an optional second set of roll of wrapping material supporting rollers.

22. A cylindrical object wrapping machine comprising a plurality of spaced apart driven wrapping rollers providing an object receiving recess therebetween; wrapper feeding means supplying wrappers to said rollers; a cylindrical-object supporting tray having a cylindrical-object discharge portion positioned in registration with the object receiving recess provided by said rollers; pivot means supporting said tray, whereby said tray may be pivotally moved into an out-of-the-way position with the object delivery portion thereof clear of said rollers; and readily releasable latch means connected with said tray, whereby said tray is secured in object-delivery relation to the object receiving recess provided by said rollers.

23. A cylindrical object wrapping machine comprising a frame; a mounting plate carried by said frame; a plurality of driven wrapping rollers mounted on said mounting plate; readily detachable means securing said mounting plate to said frame, whereby said mounting plate with the wrapping rollers thereon may be readily detached for cleaning and repair; wrapper feeding means supplying wrappers to said rollers; and cylindrical object-feeding means supplying cylindrical objects to said rollers.

24. A cylindrical object wrapping machine comprising a plurality of spaced apart driven wrapping rollers; wrapper material feeding means, whereby a continuous strip of wrapper material is advanced toward said wrapping rollers; a fixed knife member positioned adjacent the path of movement of said continuous strip of wrapper material and adjacent said wrapping rollers; a driven knife carrying cylinder rotatively supported adjacent said fixed knife and on the opposite side of the path of movement of said continuous strip of wrapping material therefrom, said cylinder having a flat surface provided thereon; another knife secured on said flat surface on said cylinder in sheering relation to said fixed knife as said cylinder rotates, whereby wrappers will be cut from said continuous strip of wrapper material; and object feeding means positioned adjacent said wrapping rollers.

25. A cylindrical object wrapping machine comprising a plurality of spaced apart driven wrapping rollers providing an upwardly opening object receiving recess therebetween; automatic wrapper feeding means supplying wrappers to said rollers; a cylindrical-object supporting tray having inclined bottom supporting cylindrical objects in side by side contacting relation, said tray having an object discharge opening adjacent one end thereof positioned over the object receiving recess provided by said rollers; means supporting said tray with the object delivery end portion thereof at a lower elevation than the other end portion, in causing the objects to roll toward said object discharge opening; escapement means moveable into the path of the cylindrical object adjacent the discharge opening in holding said cylindrical object back from said opening for releasing one at a time; and a vertically reciprocating feed bar positioned in registration above said discharge opening and the object held by said escapement means in causing the escapement to be actuated in advance of the descending feed bar in preventing possible feed bar pressure on the object while supported by said escapement means.

26. A cylindrical object wrapping machine comprising a back wrapping roller; a front wrapping roller parallel to said back roller; roller supporting means for said front roller transversely movably supporting said roller relative the front roller; a bottom wrapping roller positioned below and parallel to said other rollers; a fourth roller disposed directly above said back roller and in cooperative relation therewith in feeding forward an individual and severed wrapper in disposing the same across the tops of said back and front rollers in bridging relation; and a cylindrical object feeding means with its end disposed substantially vertically above said bottom roller in gravitationally discharging said object directly toward said bottom roller and between said front and back rollers, which rollers by reason of their position function to partially initially wrap the bridging wrapper about the cylindrical unit, said wrapper being depressed toward the bottom roller by the weight of said cylindrical object.

27. A cylindrical object wrapping machine comprising a back wrapping roller; a front wrapping roller parallel to said back roller; roller supporting means for said front roller transversely movably supporting said roller relative the front roller; a bottom wrapping roller positioned below and parallel to said other rollers; a fourth roller disposed directly above said back roller and in cooperative relation therewith in feeding forward an individual and severed wrapper in disposing the same across the tops of said back and front rollers in bridging relation; a cylindrical object feeding means with its end disposed substantially vertically above said bottom roller in discharging said object directly toward said bottom roller and between said front and back rollers; which rollers, while momentarily non-rotating, by reason of their position function to partially initially wrap the wrapper about the cylindrical unit, said wrapper being depressed toward the bottom roller by the weight of said cylindrical object; and a gate bar reciprocally mounted vertically above said bottom roller in which position its reciprocation moves the cylindrical object together with the wrapper toward the bottom roller.

28. A cylindrical object wrapping machine comprising a back wrapping roller; a front wrapping roller parallel to said back roller; roller supporting means for one of said rollers transversely movably supporting said roller; a bottom wrapping roller positioned below and parallel to said other rollers in forming with said other rollers a floatingly disposed cylindrical object-receiving pocket; driving means for each of said rollers, back, front and bottom; a fourth roller disposed directly above said back roller and in cooperative relation therewith in feeding forward an individual and severed wrapper in disposing the same across the tops of said back and front rollers in bridging relation and in momentarily releasably holding the wrapping in said bridging position; and a cylindrical object feeding means with its end disposed substantially vertically above said bottom roller in gravitationally discharging said object directly toward said bottom roller and between said front and back rollers, which rollers by reason of their position function to partially initially wrap the bridging wrapper about the cylindrical object, said wrapper being depressed toward the bottom roller by the weight of said cylindrical object.

29. A cylindrical object wrapping machine comprising a back wrapping roller; a front wrapping roller parallel to said back roller; roller supporting means for said front roller transversely movably supporting said roller relative the front roller; a bottom wrapping roller positioned below and parallel to said other rollers; a fourth roller disposed directly above said back roller and in cooperative relation therewith in feeding forward an individual and severed wrapper in disposing the same across the tops of said back and front rollers in bridging relation; and a cylindrical object feeding means with its end disposed substantially vertically above said bottom roller in gravitationally discharging said object directly toward said bottom roller and between said front and back rollers, which rollers by reason of their position function to partially initially wrap the bridging wrapper about the cylindrical unit, said wrapper being depressed toward the bottom roller by the weight of said cylindrical object, the axis of each of said front and back rollers being above the axis of said cylindrical object to be wrapped.

30. A cylindrical object wrapping machine comprising a back wrapping roller; a front wrapping roller parallel to said back roller; roller supporting means for said front roller transversely movably supporting said roller relative the front roller; a bottom wrapping roller positioned below and parallel to said back roller; the fourth roller disposed directly above said back roller and in cooperative relation therewith in feeding forward cellophane wrapping material across the tops of the front and back roller to be severed at a predetermined point; a cutting member disposed in a definite predetermined position in advance of said roller; a rotating knife disposed in cooperative relation above said cutting member, said knife having high coefficient friction material members engageable with the cellophane wrapper material passing said bottom cutting member in pushing forward the cut-off end of said wrapping material; and a cylindrical object feeding means with its end disposed substantially vertically above said bottom roller in gravitationally discharging said object directly toward said bottom roller and between said front and back rollers, which rollers by reason of their position function to partially initially wrap the bridging wrapper about the cylindrical unit, said wrapper being depressed toward the bottom roller by the weight of said cylindrical object.

31. A cylindrical object wrapping machine comprising a frame; a plurality of cylindrical object wrapping units mounted on said frame alongside of each other, each unit comprising a back wrapping roller; a front wrapping roller parallel to said back roller; roller supporting and actuating shaft for said front roller transversely resiliently movably supporting said roller relative the other rollers of said unit, said shaft being common to the several units providing independent but interconnected means for synchronously moving the front roller of each unit toward and away from the articles being wrapped, said resilient mounting functioning to permit the front roller of each unit to conform to the particular diameter of the article being wrapped by that unit; a bottom wrapping roller positioned below and parallel to said other rollers; a cylindrical object feeding means with its end disposed substantially vertically above said bottom roller in gravitationally discharging said object directly toward said bottom roller and between said front and back rollers of that unit; a reciprocating bar disposed vertically above said bottom roller, said bar being actuated by a lever; a common shaft mounting said lever of each unit; flat faced twister clam members disposed near each end of the object to be wrapped and movable in a plane at right angles to the axis of said object in holding the ends of the wrapper beyond the ends of the object while the object is being rotated in winding the wrapper there around and twisting the wrapper in forming an end closure for the same; a twister clamp member actuating shaft common to said units; a common driving shaft disposed in parallel spaced apart relation from said units; gear trains connecting the transversely movable rollers of said units with said common driving shaft; wrapper feeding rollers positioned in wrapper supplying relation relative the wrapper rollers of each unit; and common shafts mounting said wrapper feeding rollers of each unit.

32. A cylindrical object wrapping machine comprising a frame; a plurality of units of wrapping rollers mounted on said frame along side of each other, each unit comprising a plurality of parallel spaced apart wrapping rollers forming a cylindrical object-receiving pocket, said rollers being positioned as a back roller, a front roller in front of said back roller, and a bottom roller; independent resilient means supporting some of the rollers of each unit for transverse movement toward and away from other rollers of the same unit in providing for variation in the size of said pocket of the different units; common drive shafts disposed in parallel spaced apart relation from the wrapping rollers of each unit; gear trains connecting the rollers of the units with said common drive shafts; wrapper material supply means connected with the wrapping rollers of each unit; wrapper cut-off means for each unit; cylindrical object feeding means for each unit with its end disposed substantially vertically above said bottom roller in gravitationally discharging said object directly toward said bottom roller and between said front and back rollers, which rollers by reason of their position function to partially initially wrap the wrapper about the cylindrical unit said wrapper being depressed towards the bottom roller by the weight of said cylindrical object; gate bar for each unit slidably mounted vertically above said bottom roller; reciprocally actuating means for each of said bars in causing said bars to press downwardly the cylindrical object toward the bottom roller; and a shaft common to said reciprocally actuating means of the units.

33. A cylindrical object wrapping machine comprising three parallel driven spaced apart wrapping rollers positioned with the axes of two of the rollers above the axis of the other roller providing a cylindrical object receiving recess between said rollers; roller supporting means for one of the upper rollers transversely movably supporting said upper roller relative to the other upper roller; wrapper feeding means of which one of said upper rollers is a part in feeding individual and separate wrappers to said upper rollers with said wrapper extending across the top of said two upper rollers; cylindrical object feeding means having an object delivery end disposed vertically above the lowermost of said three rollers whereby the cylindrical objects to be wrapped are dropped upon said wrapper extending across said upper rollers; and a vertically reciprocating bar movable to a position between the uppermost rollers in causing the cylindrical object together with the engaged wrapper to be definitely and positively moved toward said lowermost roller.

34. A cylindrical object wrapping machine comprising back, bottom and front parallel spaced apart wrapping rollers forming a cylindrical object-receiving pocket for a cylindrical object to be wrapped floatingly disposed in said pocket; separate driving means actuating each of said wrapping rollers; front roller supporting means movable transversely of the axis of the object receiving pocket; resilient means connected with said front roller gradually urging said roller toward the other rollers; and means controllingly opposing said resilient means whereby the resilient pressure of said resilient means is prevented from breaking said object being wrapped as the floatingly disposed object is moved into wrapping position.

35. A cylindrical object wrapping machine comprising back, bottom and front parallel spaced apart wrapping rollers forming a cylindrical object-receiving pocket for a cylindrical object to be wrapped floatingly disposed in said pocket; driving means actuating each of said wrapping rollers; roller supporting means for said bottom roller which moves said roller away from the axis of the cylindrical object-receiving pocket in discharging the object to be wrapped; roller supporting means for said front roller transversely of the roller axis movably supporting said roller relative to the other rollers; and controlled resilient means connected to said front roller resiliently urging said roller toward the other rollers, whereby resilient pressure is applied to said object between said rollers in preventing breakage of said object.

36. A cylindrical object wrapping machine comprising back, bottom and front parallel spaced apart wrapping rollers forming a cylindrical object-receiving pocket for a cylindrical object to be wrapped floatingly disposed in said pocket; driving means actuating each of said wrapping rollers; roller supporting means for said bottom roller which moves said roller away from the axis of the cylindrical object-receiving pocket in discharging the object to be wrapped; roller supporting means for said front roller transversely of the roller axis movably supporting said roller relative to the other rollers; resilient means connected to said front roller resiliently urging said roller toward the other rollers; and a cam opposing said resilient means in providing gradual engagement of said front roller with said floatingly disposed object to be wrapped.

37. A cylindrical object wrapping machine comprising a back wrapping roller; a front wrapping roller parallel to said back roller; roller driving and supporting means for one of said rollers transversely movably supporting said roller in moving it away from and toward the other rollers; a bottom wrapping roller disposed below and substantially in a vertical plane between the other rollers each of said rollers being of a cylindrical form with its longitudinal axis disposed parallel and cross sectionally considered in the apexes of a triangle forming an upwardly open chamber therebetween for receiving a floatingly disposed cylindrical object therein; and a cylindrical object feeding means with its end disposed above and substantially in the vertical plane through said bottom roller in gravitationally discharging said object to be wrapped directly toward said bottom roller and into said chamber where it is floatingly engaged by said rollers.

38. A cylindrical object wrapping machine comprising a back wrapping roller; a front wrapping roller parallel to said back roller; roller driving and supporting means for one of said rollers transversely movably supporting said roller; a bottom wrapping roller positioned below and parallel to said other rollers, each of said rollers being of a cylindrical form with its longitudinal axis disposed parallel and cross sectionally considered in the apexes of a triangle forming an upwardly open chamber therebetween for receiving a cylindrical object floatingly disposed therein; a cylindrical object feeding means with its end disposed vertically above said bottom roller; and a reciprocating feed bar movable transversely of the end of said feeding means, said bottom roller being in the plane of movement of said reciprocating feed bar in gravitationally discharging said object directly toward said bottom roller and into said chamber where it is floatingly engaged by said rollers.

39. A cylindrical object wrapping machine comprising a back wrapping roller; a front wrapping roller parallel to said back roller; roller driving and supporting means for said front roller transversely movably supporting said roller relative the front roller; a bottom wrapping roller positioned below and parallel to said other rollers forming with said other rollers an object-receiving pocket for receiving cylindrical objects floatingly disposed therein; a cylindrical object feeding means with its end disposed above said bottom roller; and a reciprocating feed bar movable transversely of the end of said feeding means, said bottom roller being in the plane of movement of said reciprocating feed bar in discharging said cylindrical object to be wrapped directly toward said bottom roller and between said front and back rollers.

40. A cylindrical object wrapping machine comprising a back wrapping roller; a front wrapping roller parallel to said back roller; roller supporting means for said front roller transversely movably supporting said roller relative the front roller; a bottom wrapping roller positioned below and parallel to said other rollers forming a cylindrical and floatingly disposed object-receiving pocket therebetween; wrapping material feeding means; wrapping material cutting means located in line of feed after said wrapper material feeding means; a fourth roller disposed directly above said back roller and in cooperative relation with said back roller and said wrapping machine feeding means in feeding forward said wrapper material while maintaining the same under tension to be severed by said cutting means at a predetermined length, said severed wrapper being fed across said back and front rollers in bridging relation; and a cylindrical object feeding means with its end disposed substantially vertically above said bottom roller in gravitationally discharging said object directly toward said bottom roller and between said front and back rollers, which rollers by reason of their position function to partially initially wrap the bridging wrapper about the cylindrical object, said wrapper being depressed toward the bottom roller by the weight of said cylindrical object.

References Cited in the file of this patent

UNITED STATES PATENTS

| | | |
|---|---|---|
| 718,747 | Bermauer | Jan. 20, 1903 |
| 721,667 | Butter | Mar. 3, 1903 |
| 1,022,902 | Ware | Apr. 9, 1912 |
| 1,038,361 | Hart | Sept. 10, 1912 |
| 1,072,505 | Roedel | Sept. 9, 1913 |
| 1,095,853 | Graves | May 5, 1914 |
| 1,107,360 | Roedel | Aug. 18, 1914 |
| 1,116,560 | Buhse | Nov. 10, 1914 |
| 1,163,709 | Thorschmidt | Dec. 14, 1915 |
| 1,271,603 | Mortimer | July 9, 1918 |
| 2,103,390 | Salfisberg | Dec. 28, 1937 |
| 2,120,789 | Rooth | June 14, 1938 |
| 2,250,617 | Paulsen | July 29, 1941 |
| 2,297,432 | Rasch et al. | Sept. 29, 1942 |
| 2,548,136 | Auer | Apr. 10, 1951 |

FOREIGN PATENTS

| | | |
|---|---|---|
| 87,056 | Sweden | Aug. 4, 1936 |